United States Patent
Clay et al.

(10) Patent No.: US 7,672,921 B1
(45) Date of Patent: Mar. 2, 2010

(54) SYSTEMS AND METHODS FOR AUTOMATICALLY DETERMINING AND/OR INFERRING COMPONENT END OF LIFE (EOL)

(75) Inventors: William S. Clay, Brunswick Hills, OH (US); Richard A. Sykora, Stow, OH (US); James R. Morrison, Chardon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 753 days.

(21) Appl. No.: 10/970,502

(22) Filed: Oct. 21, 2004

Related U.S. Application Data

(63) Continuation-in-part of application No. 10/889,840, filed on Jul. 13, 2004.

(60) Provisional application No. 60/547,619, filed on Feb. 25, 2004.

(51) Int. Cl.
*G06N 5/00* (2006.01)
(52) U.S. Cl. .......................................... 706/45; 706/12
(58) Field of Classification Search .................. 706/45, 706/47, 12
See application file for complete search history.

(56) References Cited

U.S. PATENT DOCUMENTS

| | | |
|---|---|---|
| 2002/0077850 A1 | 6/2002 | McMenimen et al. |
| 2002/0143665 A1* | 10/2002 | Santos et al. .................. 705/28 |
| 2003/0120589 A1 | 6/2003 | Williams et al. |
| 2003/0172017 A1 | 9/2003 | Feingold et al. |

FOREIGN PATENT DOCUMENTS

WO 02060235 8/2002

OTHER PUBLICATIONS

A Proactive Tool for Managing Diminishing Manufacturing Source and Material Stortages (DMS) 1999.*
Renee M Robbins, "Proactive component obsolescence management" A-B Journal, Sep. 2003.*
Renee Robbins ("proactive component obsolescence management" Sep. 2003).*
Renee M. Robbins, "Proactive Component Obsolescence Management," AB Journal, Sep. 2003, pp. 49-54.
A Proactive Tool for Managing Diminishing Manufacturing Source and Material Shortages (DMS). 1999 Information Handling Services, Inc.
European Search Report dated Jul. 29, 2005 for European Patent Application Serial No. EP05003765, 3 pages.

* cited by examiner

*Primary Examiner*—David R Vincent
*Assistant Examiner*—Lut Wong
(74) *Attorney, Agent, or Firm*—Turocy & Watson LLP; R. Scott Speroff

(57) ABSTRACT

The invention relates to a system and methodology for facilitating managing product life cycle. A component that determines relevance of components to a product; an analyzing component that determines, infers or predicts obsolescence, level of risk to EOL of a subset of the components. A substitution component that identifies replacement components and suppliers for the subset of components. A cost analysis component that determines material/components cost savings, and redesign cost implementation and/or redesign cost avoidance. A viability component that measures reliability of a component. A transition component that identifies components that require updating or replacement. A profitability component that determines the expected revenue derived from a component over its projected remaining life.

18 Claims, 15 Drawing Sheets

SYSTEMS AND METHODS FOR AUTOMATICALLY DETERMINING AND/OR INFERRING COMPONENT END OF LIFE (EOL)

CROSS REFERENCE TO RELATED APPLICATIONS

This application is a continuation-in-part of U.S. patent application Ser. No. 10/889,840 filed on Jul. 13, 2004 entitled, "SYSTEMS AND METHODS FOR AUTOMATICALLY DETERMINING AND/OR INFERRING COMPONENT END OF LIFE (EOL)", which claims priority to U.S. Provisional Application 60/547,619, filed on Feb. 25, 2004 entitled, "SYSTEMS AND METHODS FOR AUTOMATICALLY DETERMINING AND/OR INFERRING COMPONENT END OF LIFE (EOL)", the entireties of these applications are incorporated herein by reference.

TECHNICAL FIELD

The subject invention relates generally to systems and methods for automatically determining and/or inferring component end of life (EOL), level of risk to EOL, and the impact thereof as well as product viability assessment.

BACKGROUND OF THE INVENTION

In 1998, electronic component manufacturers discontinued 34,000 parts. In years 2001 and 2002, that number rose to 55,000 and 120,000 parts respectively according to PCNalert, a company that tracks supply base end-of-life notices. With recent market trends this rapidly growing rate may decline; however, the average yearly EOL level is expected to remain markedly high.

Companies that maintain large product portfolios, for example, can utilize over 25,000 semiconductor, passive, and magnetic components, which can be sourced by more than 300 manufacturers. Many of these products consist of 10-20 different suppliers providing some 20 to 50 different electronic components. Also, a majority of these products have a minimum life of 10 years, with many customers keeping them in service for decades, especially within the industrial, automotive, telecommunications, and military market sectors. Further, a sampling of 23,000 components utilized by some 10,000 products lead to the determination that approximately 54% of such components were beyond their mature phase of life, with some 34% declining in use, or identified for phase out. Moreover, a survey of Fortune 500 companies, conducted by CSM Strategies, reported that users of these types of components experienced, on average, a 3% per year rate of EOL for their active bill of materials (BOM)—this places a significant percentage of components at risk to EOL.

An aggregation of the aforementioned factors, present a problem of not "if", but "when" will a given product be affected by end-of-life events. Conventional mitigation of an EOL occurrence does nothing to anticipate or elevate within a near horizon, the probable occurrences of the next event on the same product. Consequently, product changes driven by these events are typically disjoint, which places an increasing burden on already constrained development and continuation engineering resources. Such demand leads to accelerated inventory costs due to bridge buys needed to maintain product shipments until resources can be implemented. This ultimately results in decreased revenue, increased risk to new product development, and customer dissatisfaction.

The burden on constrained development and continuation engineering resources can be further mitigated with the subject invention through use of viability assessment tools used in conjunction with planning and prioritization tools. Since the impact of components at risk to EOL requires strategic considerations during planning processes and project prioritization the use of viability assessment and analysis can facilitate the planning and prioritization stages during a product life cycle. Viability assessment has been defined in an IEEE transaction paper as the measure of the Producibility, Supportability, and Evolvability of a product. The underlying premise of viability assessment is that the economic well-being of a company is inextricably linked to the sustainability of products. Currently there is no connection between viability assessment and obsolescence risk and no way to measure the viability of a product. Companies today are forced to chose between various projects that are competing for resource bandwidth and funding, and require a consistent set of and methodology for determining viability factors to be considered during planning processes and to assist with project prioritization. Therefore, to improve viability, planning must be conducted on a proactive basis to increase productivity and efficiency as a metric to assist in viability product management.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to system(s) and methodology(s) for determining end of life (EOL), and level of risk to EOL of components and the impact thereof as well as product viability assessment. As discussed above, in 1998, electronic component manufacturers discontinued 34,000 parts—the equivalent of 153 parts per business day. Many products consist of multiple components, electronic and mechanical, provided by as many as 50 different suppliers. Such products can have a fairly extensive useful life (e.g., at least 10 years), with many customers using the products for decades. The subject invention addresses the issue of such product(s) being affected by an obsolete or high "RISK" component, and provides a novel scheme for mitigating negative impact associated with component obsolescence.

One particular aspect of the invention provides for a database tool that is employed to determine, infer and/or predict which components (e.g., processors, memory chips, resistors, opto-electronics, software, mechanical components . . . ) will likely need replacement over the course of a product's expected life. This aspect of the invention includes a material risk index (MRI) tool that ties a set of algorithms to a detailed and unique database. It analyzes a product's bill of material and scores components on a scale (e.g., from zero to five), where the greatest score for example indicates highest risk to End-of-Life (EOL). The tool can also track components of a product, as well as its suppliers. Regular dialog with suppliers about when a specific component will be discontinued, coupled with market data, technology life cycle and other information, allows the Material Risk Index tool to predict what products need attention and when. Product engineers and/or an automated aspect of the system can begin finding replacements, scheduling redesign work and notifying others that changes are on the way. Thus, the invention facilitates proactively maintaining product life cycles based in part on a fact based framework for deciding when to perform product upgrades.

The invention provides for switching a supplier or component, in a manner which can be transparent to a customer. The system facilitates components being backward-compatible, and available in suitable quantities and for a time frame required to support the expected product life. It is to be appreciated that, in accordance with a particular aspect of the invention, individuals can be tasked with keeping the data fresh and the tool useful. For example, value engineers can run risk analyses on product components and work with design engineers to make sure there are migration paths for the respective components—engineers can communicate with part suppliers on a regular basis and provide supplier roadmaps. These roadmaps can be used as indicators from the suppliers themselves about expected life, technology and market trends of the specific components they provide. Moreover, another aspect of the invention provides for computer-based systems to automatically perform at least a subset of the aforementioned task that can be carried out by humans.

Yet another aspect of the invention provides for a database tool that performs viability assessment of a product. Viability assessment provides a measure of the Producibility, Supportability and Evolvability of a product. While the viability of a product may be defined in numerous ways, the underlying premise of viability is that the economic well-being of a company is intertwined to the sustainability of such products. This invention provides MRI modules to address the impact of various elements of viability or sustainability over the estimated life of a product and to ascertain the result of various elements or factors on the product's profitability, as well as to assist in planning and prioritization as relates to products. For example, a profitability analysis component is provided to determine the estimated profitability of retaining the current product, the impact of obsolescence or EOL of a product, as well as the cost versus revenue impact of keeping a current product, replacing the product or reengineering the product. A viability analysis component is provided that assists in determining viability factors to be considering during planning processes, such as annual planning, and to assist with project prioritization. The viability analysis component analyzes a subset of the various viability factors or elements as an Index of Viability. The Index of Viability can rank a product to assist with planning and prioritizing of reengineering efforts. Therefore, this invention provides consistent consideration of those efforts of viability that aid in meeting customer expectations for product availability while maintaining/improving direct costs, minimizing re-engineering and incremental indirect costs, through proactive analysis, and optimize revenue.

To the accomplishment of the foregoing and related ends, certain illustrative aspects of the invention are described herein in connection with the following description and the annexed drawings. These aspects are indicative of various ways in which the invention may be practiced, all of which are intended to be covered by the invention. Other advantages and novel features of the invention may become apparent from the following detailed description of the invention when considered in conjunction with the drawings.

DETAILED DESCRIPTION OF THE INVENTION

The invention relates to system(s) and methodology(s) for determining end of life (EOL) of components and impact thereof. The invention addresses the issue of such product(s) being affected by an EOL component, and provides a novel scheme for mitigating negative impact associated with component obsolescence.

As used in this application, the terms "component," "analyzer," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
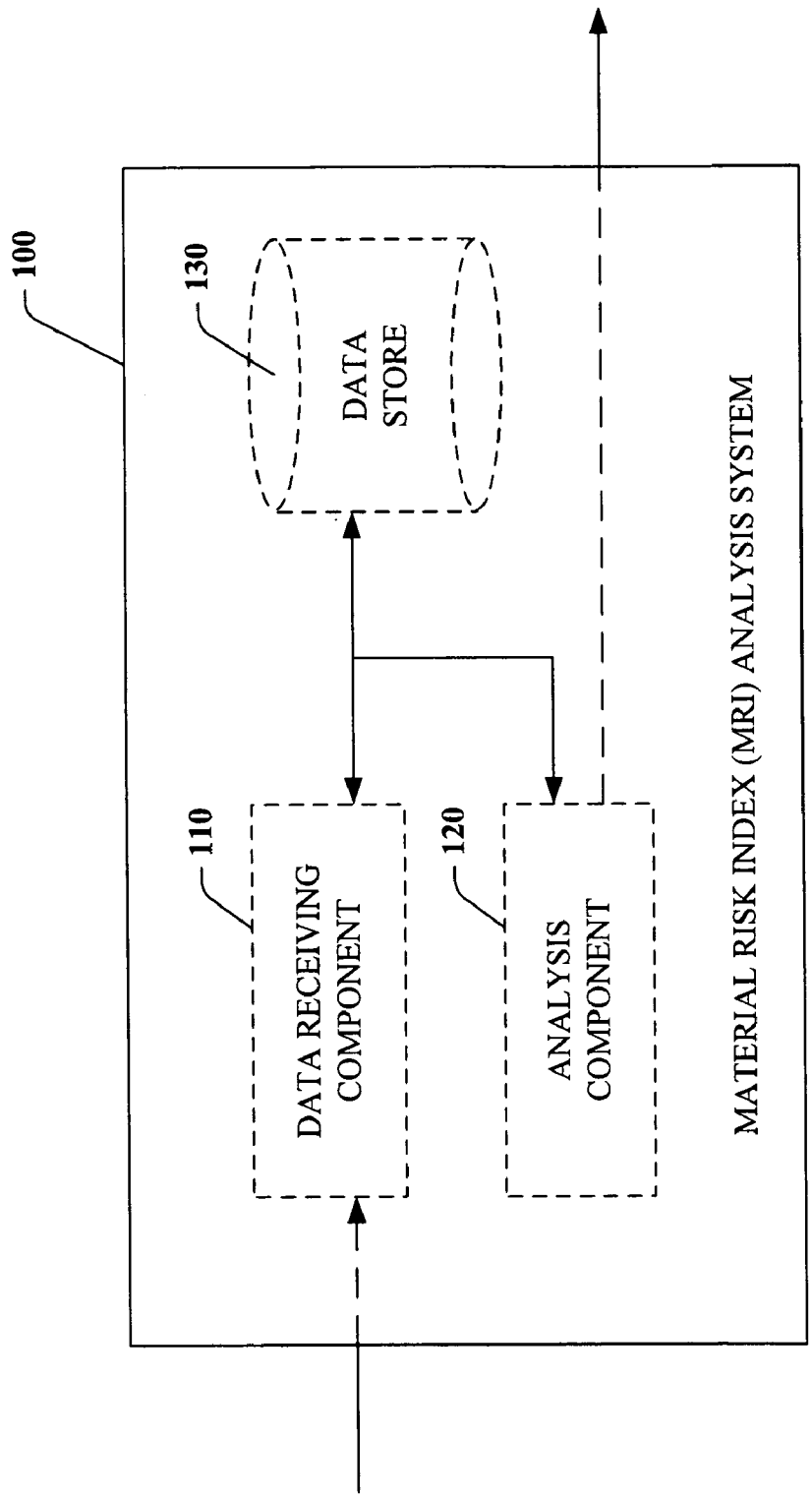
FIGS. 1-4 are schematic block diagrams illustrating a material risk index (MRI) analysis system(s), in accordance with the invention.

Referring initially to FIG. 1, a material risk index (MRI) analysis system 100 is illustrated in accordance with a high-level aspect of the invention. The MRI system 100 includes a data-receiving component 110 that receives information pertaining to products and components thereof as well as extrinsic data. An analysis component 120 analyzes a subset of the received data in connection with determining potential obsolescence and RISK to EOL of components of products. A data store 130 can store information from either or both of the receiving component 110 and analysis component 120 as well as rules, tables, indices, algorithms, historical data, schemas, etc., to facilitate material risk analysis in accordance with the invention. The analysis component 120 evaluates the received data and determines, infers and/or predicts risk and/or impact of potential obsolescence or unavailability of a component in connection with a product as well as impact on super classes of products/process/systems employing the products. The system 100 can facilitate taking proactive measures to mitigate negative consequences associated with obsolescence/unavailability of certain components. For example, suitable replacement components and suppliers thereof can be identified and engaged.

The system 100 can leverage off of human-based assistance in connection with component evaluation and/or performing largely computer-based analysis and automated action (e.g., via a decision-theoretic approach). For example, one particular embodiment of the invention can take into consideration the cost associated with continuing to employ a component (or replacing the component) for example as a function of various client/customer-based metrics, and balance the benefits of such action versus the associated cost thereof—utility based analyses.

In accordance with one specific implementation of the invention (that is not intended to limit the scope of the invention as defined by the hereto appended claims), the material risk index (MRI) system 100 analyzes a product's bill of material and scores a component on a scale from zero to N (N being an integer), where N indicates the highest risk of EOL. A supplier material risk index (SMRI) is based on the following equation:

$$SMRI = b_0 + b_1(SSC) + b_2(ASC) + b_3(LCC) + b_4(CL) + \ldots + b_N(AV)$$

SSC is the Supplier Status Code—each supplier part, and thus supplier, is categorized into technology classifications. Then each supplier is assigned a preference for every part (relative to the part/supplier classification) it provides. A supplier can be rated Preferred, Alternate, Migrate Away or Other. Parts from preferred suppliers are considered lower risk. Supplier performance, and financial data are considered when determining these ratings.

ASC is an Alternate Source Code—a part with multiple approved sources, or possible alternatives not yet approved, is a lower risk than one with a single, sole source.

LCC is the Component Life Cycle Code—a curve-fitting algorithm is used to generate a score based on life cycle phase data of each part. The life cycle phase can be Introduction, Growth, Early Mature, Mature, Late Mature, Decline, Phase-Out or Obsolete. A mature component is lowest risk, while an obsolete one is highest risk. Further, components in their Introduction or Growth Phase are higher risk than one in its mature stages.

CL is the part Classification Life Cycle Code—the categories are the same as the LCC factor, but applied to an entire part classification or technology. The algorithm generates a score based on the Class Life Cycle phase and an estimate for the number of years to obsolete for that supplier part, as well as the entire part class. The individual component and the part classification life cycles can be very different. For example, 4000 series CMOS logic as a component technology is approaching obsolescence and should be avoided in new designs. However, individual parts within this classification may be considered in the late mature or early decline phase of their life cycle.

AV is the Availability Code—this factor is based on the forecasted number of years to end of life, various last-time-buy and price list indicators, breadth of customer base, supplier/class obsolescence ratio, and component market sector driver. A high number of years to end of life, large customer base and usage, low obsolescence ratio and no last-time-buy notices or pricing activity translate into a lower risk. The "bn" coefficients are obtained through multi-regression analysis to best fit the risk factors data. Since internal company part numbers can have multiple supplier part numbers associated with them, each supplier part number is assigned an MRI score (SMRI). In turn, each internal or company part number is assigned an MRI score (RMRI) based on the minimum supplier (SMRI) score, using the formula RMRI=Min (SMRI1, SMRI2, ... SMRIn).

Traditionally, when a company receives a part change notice (PCN) or end-of-life (EOL) notification from a component supplier, typically one of four things may occur. A last-time buy may be performed to assure that the affected products can be manufactured throughout their forecasted life times. This defensive purchasing of parts can tie up millions of dollars in inventory, some of which may never be used. The subject MRI system 100 helps to minimize last-time-buy purchases by eliminating high-risk components prior to EOL. A replacement part may be qualified or the product(s) may be redesigned to eliminate these high-risk components. A "bridge buy" for the obsolete part is often then required to ensure that product can be manufactured until the new part/new design is available, and the redesign cycle is generally very costly and resource intensive. Even worse, multiple EOL notices mean a product may have to begin another redesign cycle within months of completing one. As a result, fewer engineering resources are available for new product development. The MRI helps to mitigate the number of redesigns by addressing high-risk components concurrently. Aftermarket sources of the component may be found or parts may be salvaged from other products, but these actions are not feasible for high-volume usage. MRI helps to minimize aftermarket purchases by eliminating high-risk components before EOL. The affected products may be declared obsolete. This is usually unacceptable to both customers and to product suppliers—the MRI helps to avoid obsoleting products.

Components can fall into numerous technology classifications, and the invention provides for adding and/or deleting classifications over the life of the tool. Optionally, the tool can be configured to not track low-risk commodities (e.g., connectors, screws or magnetics), but rather track high-risk commodities (e.g., electronic components that come from suppliers).

The MRI system 100 can be used to support product life cycle management (PLM), a business strategy that creates a data record for a given product over its entire life cycle, from concept to end of life. The subject system 100 is unique compared to conventional product life cycle management systems/methods because it tracks component availability and measures the risk of continued use, not just date that a supplier says something will be discontinued. Availability is not just notification of obsolescence or lead-time, but also comprises availability from alternate sources and its breadth of usage in market(s). For example, the invention can track how many companies are buying a part, because if only three companies are using it, and one decides not to, that would put it at a higher risk of becoming unavailable. Mature products of a portfolio, for example, can be the ones more likely to have problems with sourced components. Many of such legacy products can be 10 years old or older. The MRI tool 100 substantially facilitates managing "continuation engineering" of such products, by determining, inferring and/or predicting what products need attention and when. For example, a user of one particular embodiment of the invention could simply press a button and the tool would rank all catalog numbers (which could be in the thousands) and display to the user a ranked order list of these products by level of risk to component EOL, as well as identify to the user which ones he/she is responsible for and facilitate assignment of resources to address such risk(s).

Figure 2:
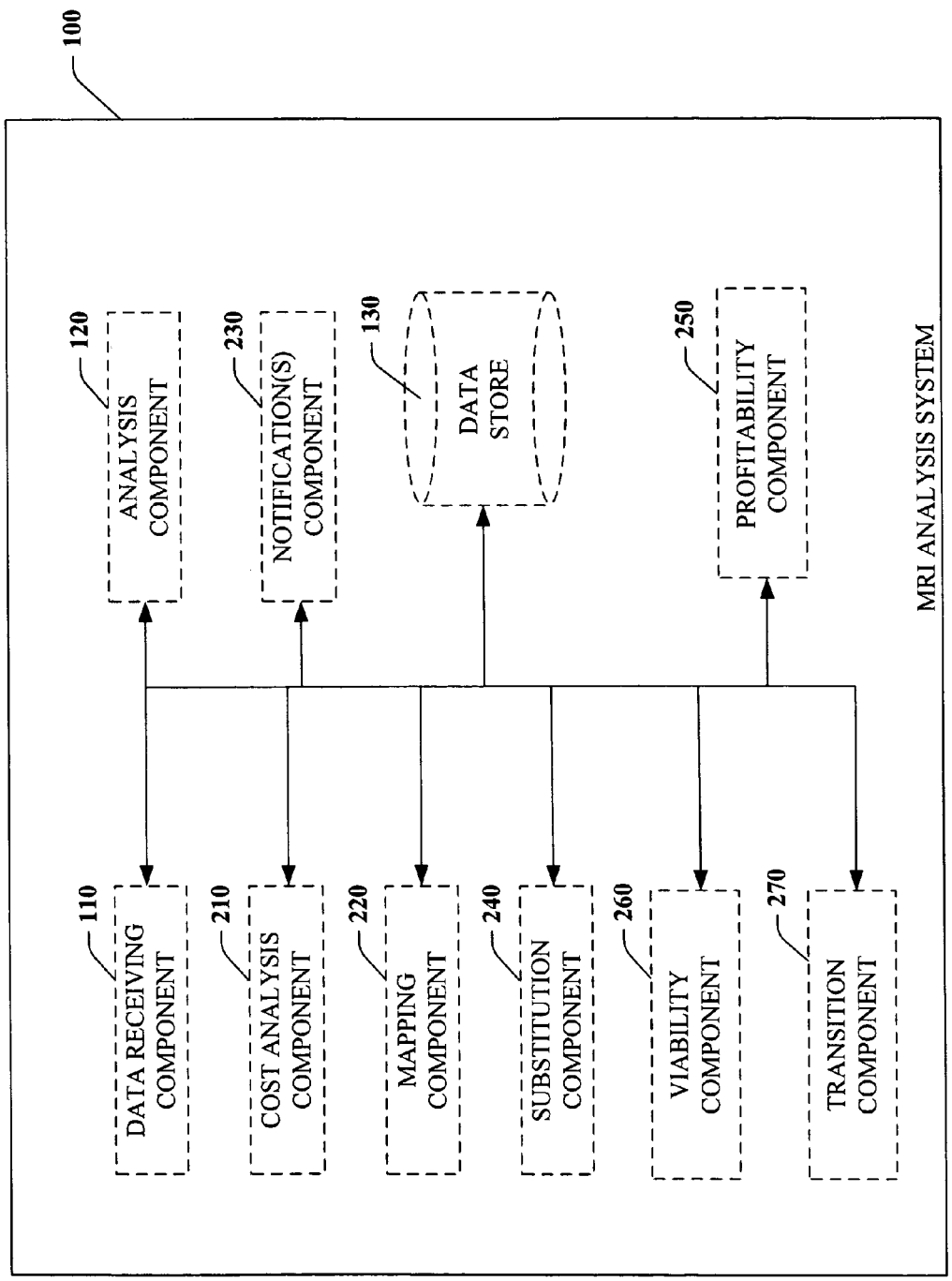

FIG. 2 illustrates another aspect of the system 100. The system 100 further includes a cost analysis component 210 that determines savings relative to redesign avoidance efforts not previously identified prior to initiating a Materials Risk Analysis. More particularly, for example, the cost analysis component 210 can determine that an equivalent to a product at or near EOL is unnecessary since a new design does not include that product. Also, the cost analysis component 210 can provide a database of cost saving measures such as design suggestions from various users. In this manner, a more intelligent analysis can be performed and facilitate the analysis component 120 rendering an appropriate analysis in connection with specific systems, products, and components vis-à-vis particular suppliers, product sellers and customers.

A mapping component 220 facilitates mapping components to suppliers, products, products to other products, processes, and systems in order to facilitate a substitution component effecting an optimized selection of appropriate replacement components. A notification component 230 can provide notification(s) to individuals, computers or systems regarding risk analyses and recommendations in accordance therewith by the system 100. The notification component 230 can communicate via a plurality of disparate mediums such as a LAN, WAN, wireless, etc. to provide EOL information pertaining to replacement of a particular product to a user. Additionally, the notification component 230 can be programmed such that messages are sent (e.g., to a user, database, etc.) on a periodic basis, every time a condition is met, when polled, etc.

A substitution component 240 can be employed to provide a list of suitable products utilized in place of a specific component. Such a list can comprise various parameters associated with substitute products such as size, power consumption, delivery time, cost, etc. For example, if a particular desired non-contact sensor is currently unavailable the substitution component 240 can provide a listing of equivalent non-contact sensors to the user. The substitution component 240 can provide a ranking of suitable substitutes based on various parameters specified by the user. For instance, if equivalent output rate of an electrical component is important to the user and equivalent cost is not, the substitution component 240 can provide a ranking based on such user specified importance levels. In this manner, costs associated with the unavailability of specific desired products can be mitigated.

In addition, the substitution component 240 can determine the cost to implement the replacement components and subsequent cost saving associated with making such a substitution. Implementation of the product can include associated installation costs such as wiring, control requirements, labor, user familiarity with product and the like. Thus, the substitution component 240 can provide a comprehensive cost metric to the user.

A profitability analysis component 250 can determine or calculate the expected revenue derived from a product over its expected remaining life. If it is determined the product will generate minimal or no profit, the profitability component 250 can determine if the product should be substituted with a replacement product, upgraded, or discontinued. The profitability component 250 can utilize expected customer needs and determine if those needs can be met with the current product offering or if substitute products are required. The profitability analysis component 250 can employ any suitable set of algorithms and/or metrics in connection with a profitability analysis in accordance with the subject invention. For example, a utility-based analysis can be implemented using trained machine learning models that weigh variables in a manner consistent with needs of a user or entity, and outputs a customized profitability analysis tailored to specific constraints and/or objectives of the user/entity. It is to be appreciated that the profitability analysis component 250 as well as other components can coordinate with one another and perform analyses and collectively provide outputs that are optimized as a function of respective tasks/duties of the components of a sub-group. In other words, the components can operate autonomously and/or collectively depending on a particular state and/or goal.

A transition analysis component 270 can assess a product to determine if the product should be removed or replaced due to the risk of EOL or obsolescence. For example, the transition component can perform analysis based on output from a risk analysis index component and a cost analysis component. The cost analysis component takes into consideration application specific direct and indirect transmission or mitigation costs and can model those costs forward in time. Based on the input from the risk analysis index component and cost analysis component the transition analysis component can determine if a product, which can be a subcomponent of a system, should be removed from the system and replaced with a different component. The transition analysis component can also determine if a product should be removed or changed if new technology has rendered the component obsolete. The transition analysis component can employ historical data, extrinsic data as well as be trained (e.g., via closed or open loop feedback control). Accordingly, for example, over time the transition analysis component can converge toward making EOL decisions in a manner consistent with optimization objectives of a user/entity.

Moreover, the transition analysis component 270 can factor resale value of a product/machine/system in connection with making a determination as to when to replace the item. For example, in certain situations the present residual value of an item may be such that it is more cost-beneficial to make early replacement of the item than wait until the value of the item depreciates to $0.00. Moreover, extrinsic factors (e.g., tax considerations, sales, accruals, insurance, energy efficiency, power output, size, maintenance costs, warranties, service contracts, scalability, upgradeability, costs and availability of replacement parts . . . ) can be factored into an analysis related to sale and/or purchase of items.

A viability component 260 determines the product's viability or sustainability based on a metric of measured product reliability. Viability has been defined as a measure of a product's Producibility, Supportability and Evolvability. Underlying viability is the concept that the sustainability of product determines its economic feasibility. The viability component 260 defines a set of viability factors. Additionally, the viability component 260 defines and utilizes a subset of the viability factors to establish an Index of Viability. The viability component 260 ranks or scores the viability factors on a scale (e.g., from one to five), where the greatest score for example indicates highest product viability requiring immediate action as it relates to planning and prioritization of replacement of a product. A low score for example may indicate a low probability that the component will require replacement in the near future. Therefore, the viability component 260 can be used to predict what products need attention and when those products need attention. This provides proactive management of product life through planning and prioritization.

The Viability Index can be defined as follows:

> Viability Index=f{Available Market Breadth,Served Market Breadth,Estimated EOL,Product Substitutions,Product Criticality,Material Risk,Technology Life Cycle,Manufacturability,Profitability, Reliability . . . }

Available Market Breadth can include the potential market available for that particular product taking into consideration any substitute or suitable replacement products that can be used in place of the particular product being analyzed. For example, the invention can track how many potential companies may purchase a particular part. A high level of available market breadth translates into a lower risk.

Served Market Breadth is a factor that takes into consideration the actual use of the product. For example, the invention can track how many companies are actually purchasing the part. If only three companies are using it, and one decides to discontinue using it, this would put it at a higher risk of being unavailable.

Estimated EOL is the estimate of product end-of-life (EOL) in years as determined from market analysis. If the product is close to the estimated EOL, the product is at a higher risk level.

Product Substitutions is the estimated range or number of possible product(s) that can be substituted for the product being analyzed. The higher the number of product substitutions, the lower the risk level.

Product Criticality is the rating for the extent to which the product being analyzed affects or interacts with other products(s) or system elements. The more other product(s) or system elements rely on a product the risk may be higher especially if the product has a short estimated EOL or if there are no alternative product substitutions.

Material Risk is the analysis of risk (Material Risk Analysis or MRI) for various materials and components on, for example, the bill of material (BOM) of the product under analysis.

Technology Life Cycle is the product technology life cycle resulting from, for example, Life Cycle analysis of the BOM and market expectations.

Manufacturability is a rating based on a BOM analysis for manufacturability and quality performance, for example, and can be based upon a Design Manufacturability Index (DIM) analysis.

Profitability is a rating resulting from financial analysis for product profitability. The higher the profitability, a high number of years to end of life, large customer base and usage and a low obsolescence ratio translate into a lower risk.

Reliability is a rating based on calculated product mean-time-between failure (MTBF) from field databases based upon Reliability Measurement System(s) (RMS). The higher the product's reliability the lower the risk.

Various other factors can be included in the Index of Viability subset depending on the particular requirements necessary for proactive planning and prioritization. The viability component 260 works with both the transition component 270 and profitability component 250 to proactively plan and prioritize product management.

Figure 3:
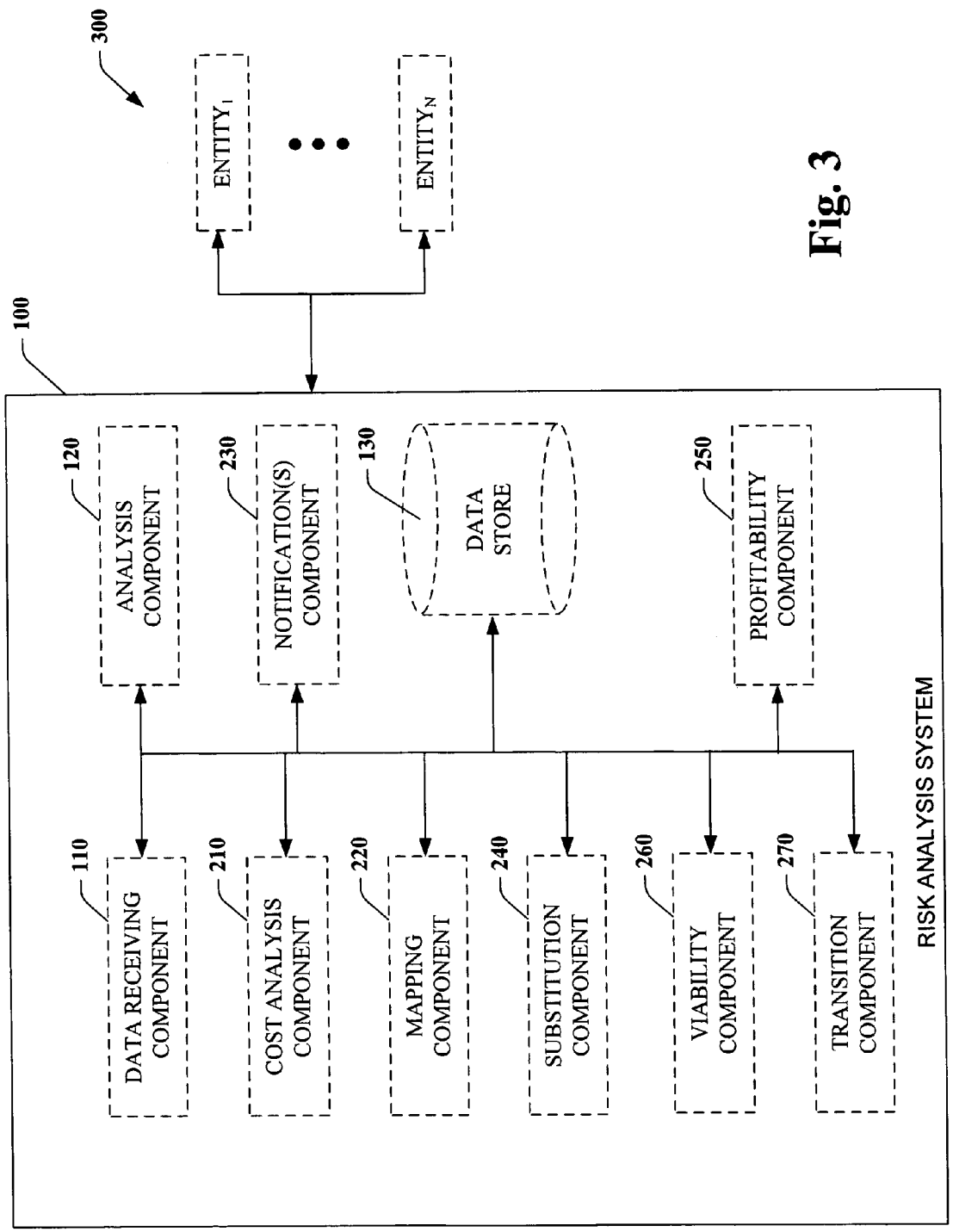

FIG. 3 illustrates that the system 100 can communicate with a plurality of entities 300 (e.g., individuals, groups, suppliers, alternate suppliers, customers, devices, computers, systems . . . ) in connection with component risk analyses—data can be received from as well as transmitted to the entities. The system 100 can communicate with one or more entities 300 via any number of methods and/or protocols such as wireless communication, Bluetooth, LAN, ControlNet, Ethernet, WAN (Internet), etc.

Also, the entities 300 can be grouped into various subsets such that each group can receive substantially the same information related to the obsolescence of currently utilized products. Such information can be tailored to a particular group's needs. For instance, a control-engineering group familiar with control related properties of a product may wish to view such technical information whereas a purchasing group may wish to view selected cost metrics associated with a product as described supra. In addition, parameters relating to data delivery, formatting and the like can be consistent for a particular group(s).

Figure 4:
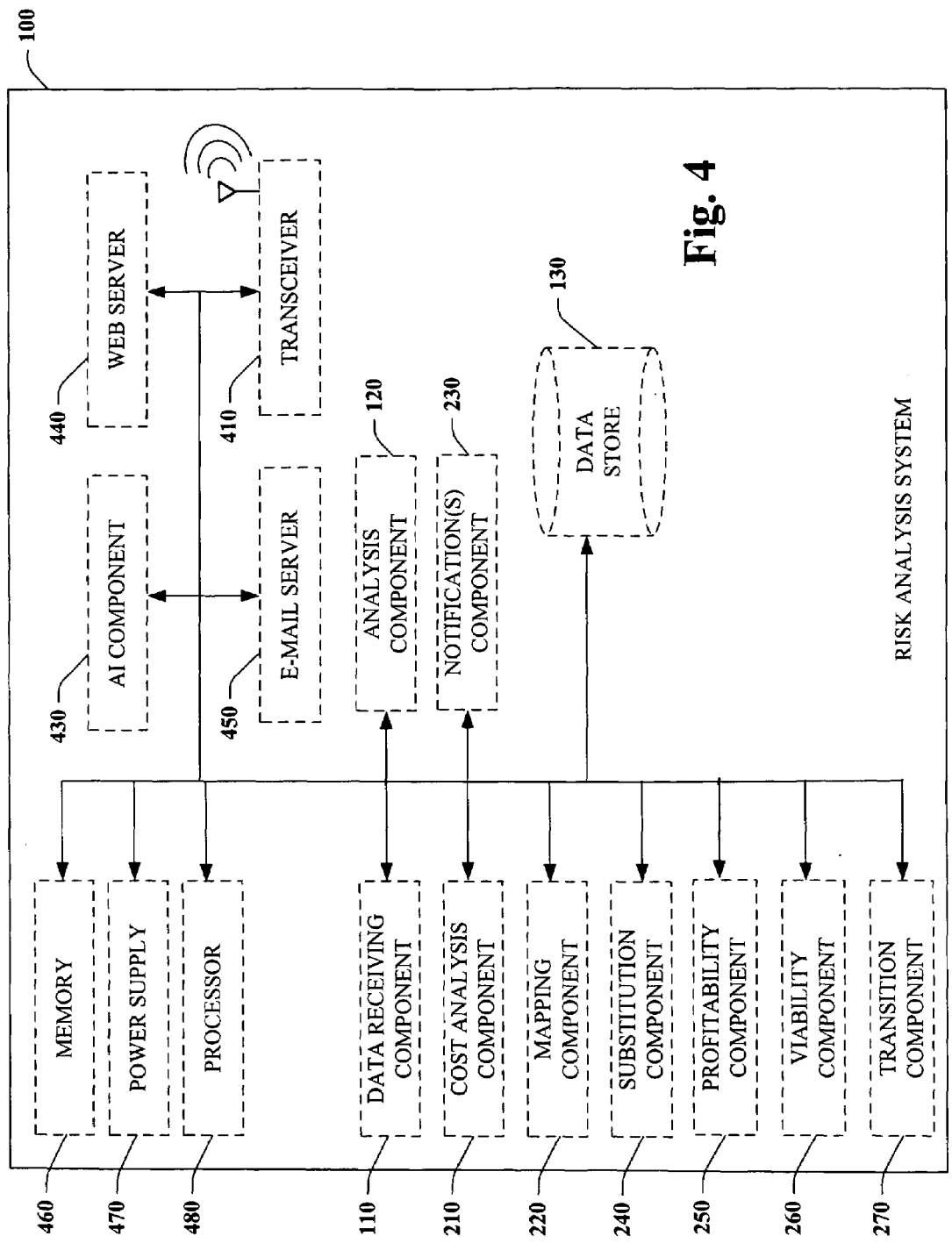

FIG. 4 illustrates the MRI analysis system 100 with various components that affect various functionalities in accordance with the invention. An artificial intelligence (AI) component 430 provides for effecting various automated functionality in accordance with the invention. The AI component 430 can employ classifiers in connection with determination, inference, diagnostics, prognostics, and prediction. It is to be appreciated that classification in accordance with various aspects of the invention can employ a probabilistic and/or statistical-based analysis (e.g., factoring into the analysis utilities and costs) to prognose or infer an action that a user desires to be automatically performed. A classifier can be a function that maps an input attribute vector, $x=(x_1, x_2, x_3, \ldots, x_n)$, to a confidence that the input belongs to a class—that is, $f(x)=$confidence(class). For example, a support vector machine (SVM) classifier can be employed—an SVM generally operates by finding a dynamically changing hyper surface in the space of possible inputs. Other directed and undirected models of classification approaches include, e.g., naïve Bayes, Bayesian networks, decision trees, and probabilistic classification models providing different patterns of independence can be employed. Classification as used herein also is inclusive of statistical regression that is utilized to develop models of priority.

The system 100 also includes a web server 440, e-mail server 450, and a wireless transceiver 410 in connection with various communicative aspects of the invention. The web server 440 can facilitate hosting of various pages, etc. to provide access to desired EOL information remotely from an intranet, Internet, LAN or the like. Various Internet protocols can be employed to provide such information to a user such as HTML, Java, XML, etc. Similarly, the email server 450 can provide EOL information via email in various formats and at user specified times. For instance, a user can have an email sent to a purchasing department when a product's EOL is within one year.

In accordance with an aspect of the subject invention, a wireless transceiver 410 can be employed to broadcast EOL information to users. Various wireless devices such as cell phones, PDAs, palmtop computers and the like can receive such EOL information. In addition, the wireless transceiver 410 can receive feedback, commands, etc. from disparate users that wish to communicate with the system 100. The system 100 also includes a memory 460, power supply 470 and processor 480 discussed in greater detail infra.

Figure 5A:
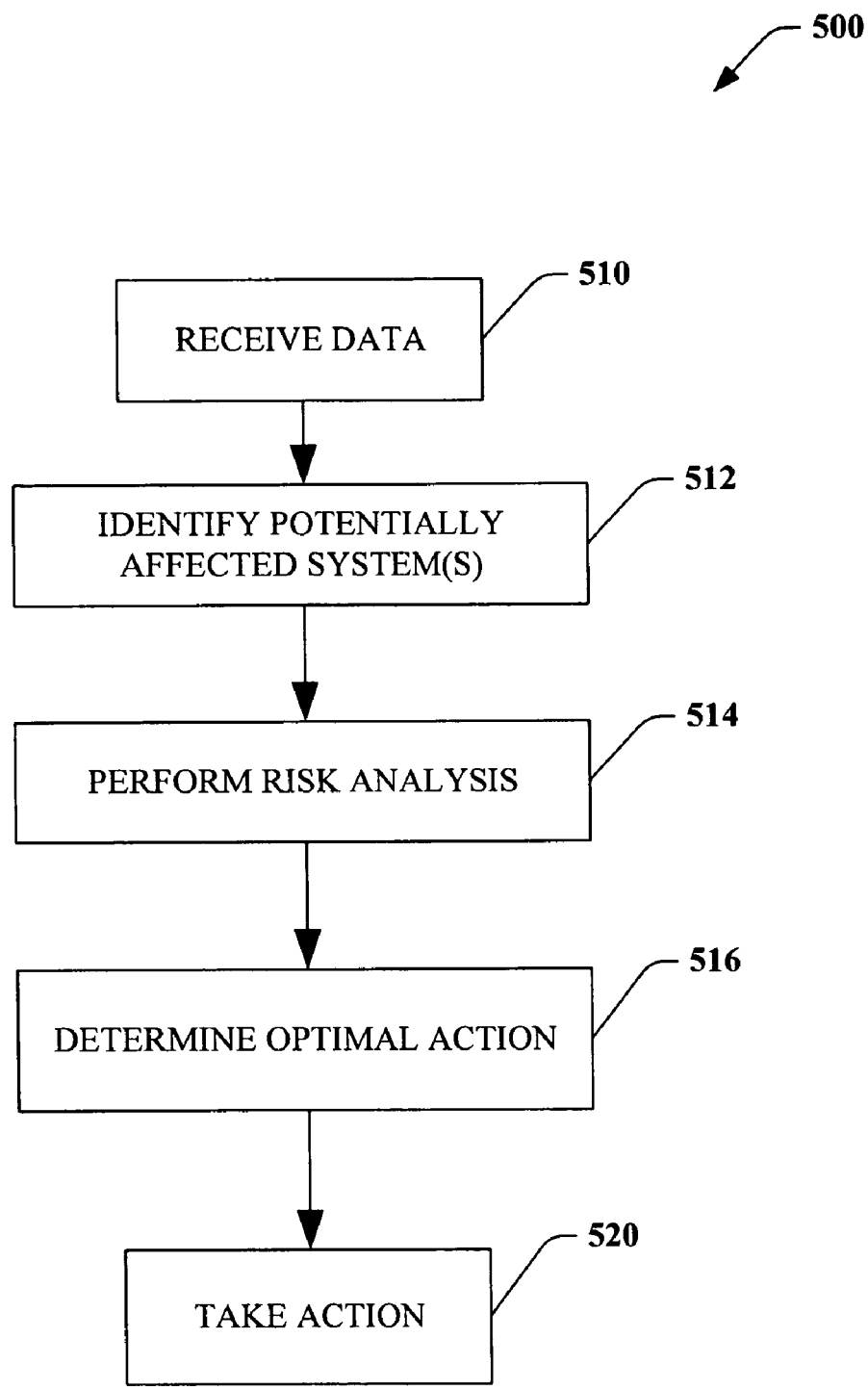
FIGS. 5-8 illustrate various methodologies in accordance with an aspect of the invention.
Figure 5B:
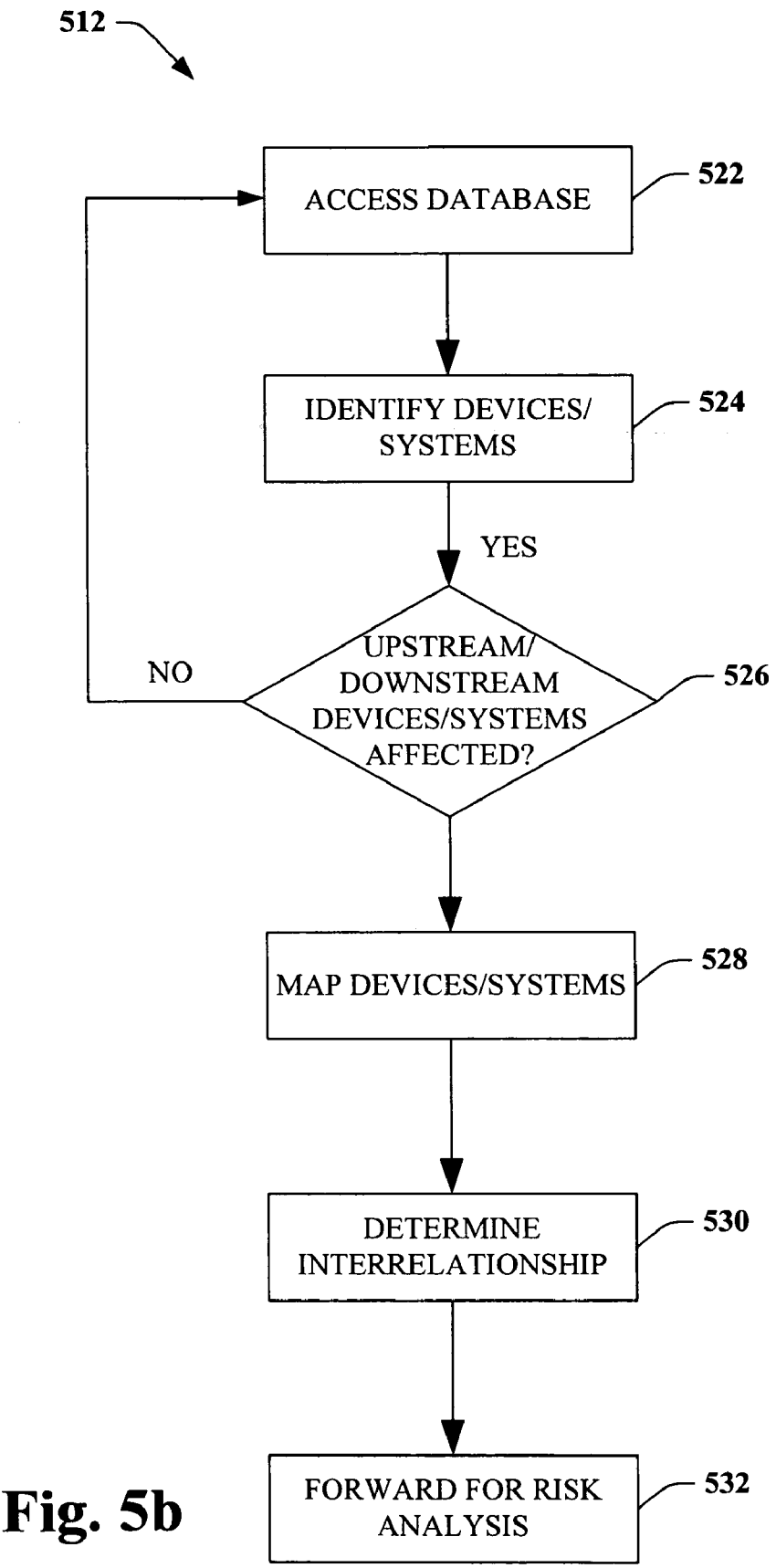
Figure 6:
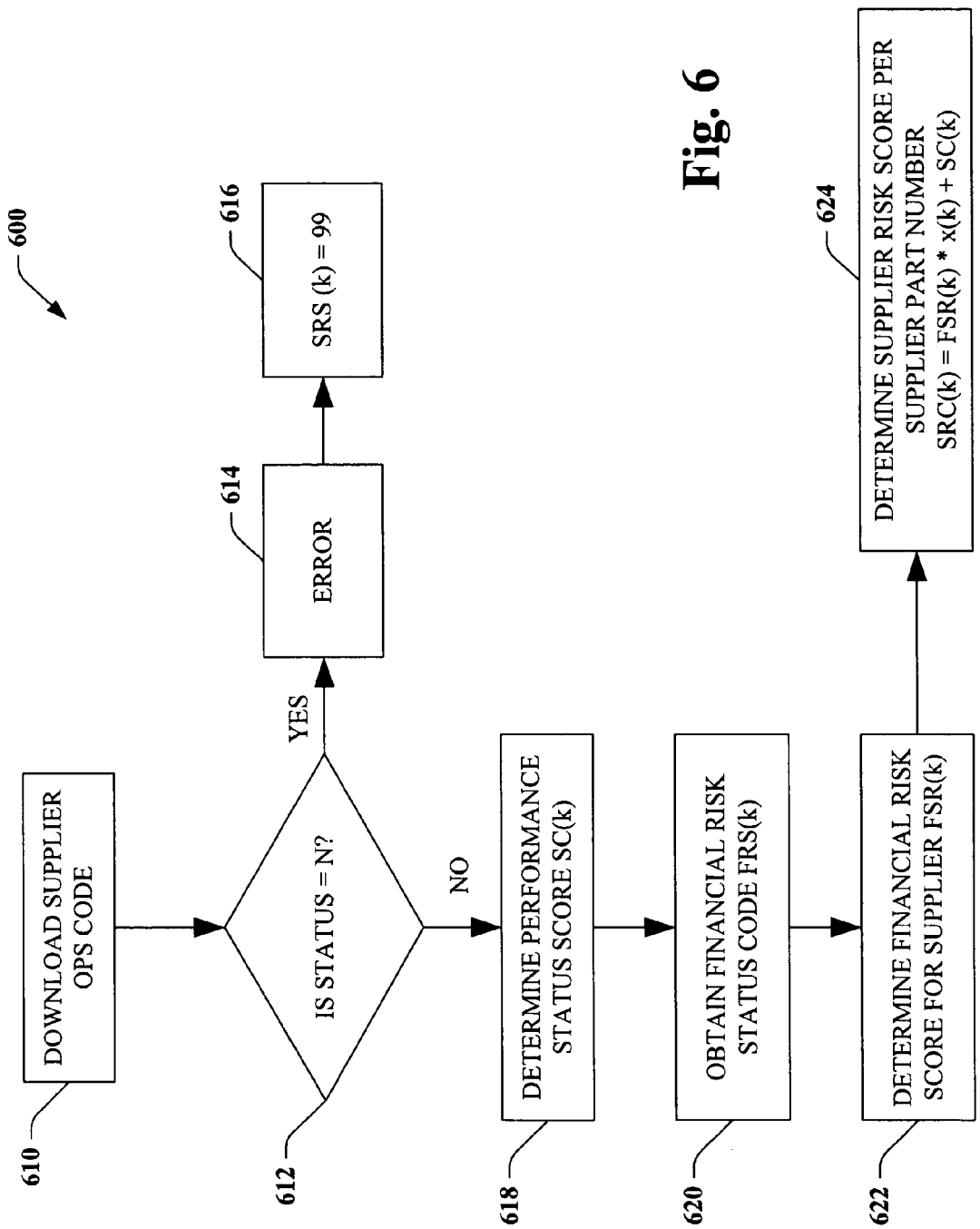
Figure 7:
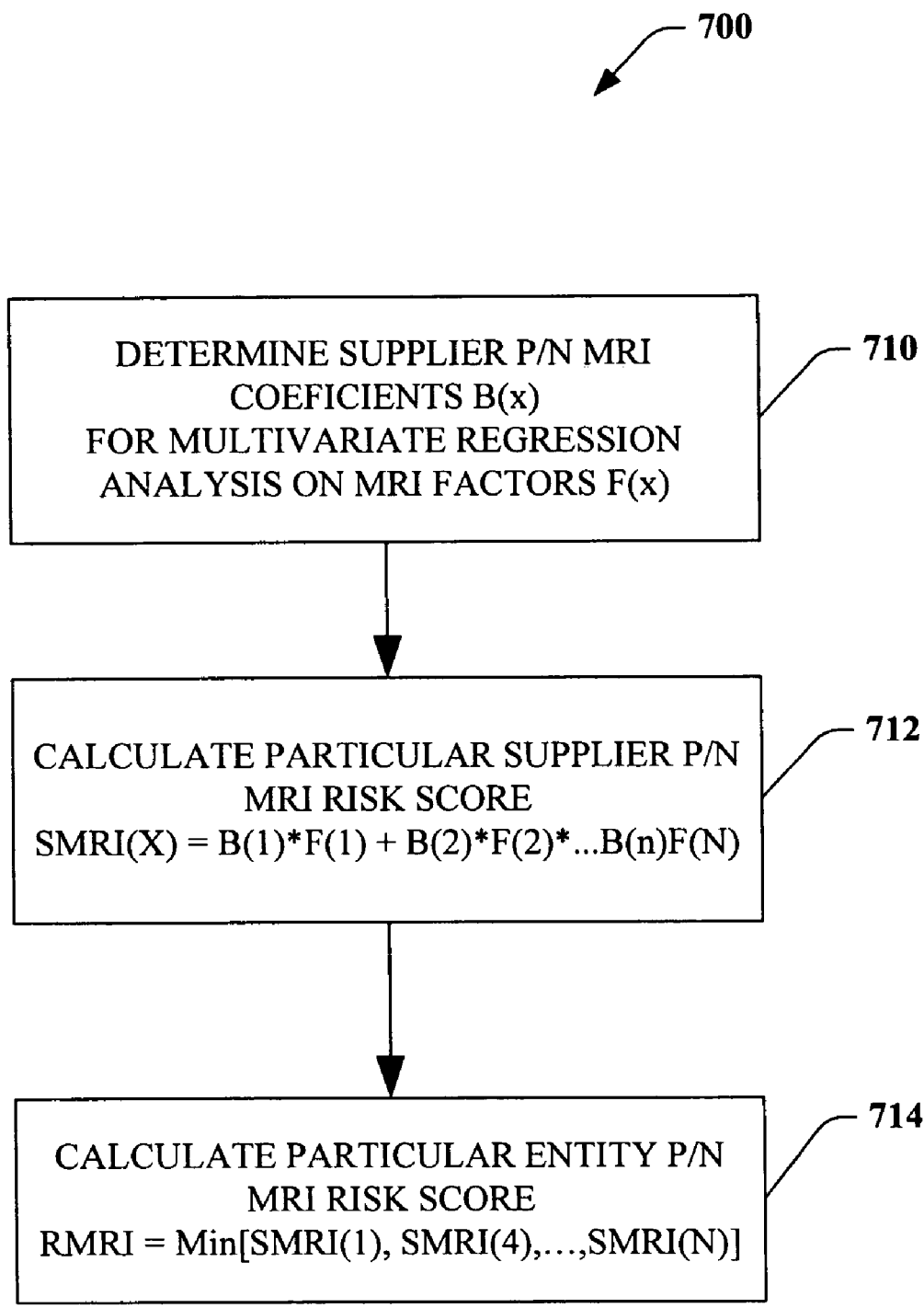

FIGS. 5-7 illustrate methodologies that may be implemented in accordance with the invention. While, for purposes of simplicity of explanation, the methodologies are shown and described as a series of blocks, it is to be understood and appreciated that the invention is not limited by the order of the blocks, as some blocks may, in accordance with the invention, occur in different orders and/or concurrently with other blocks from that shown and described herein. Moreover, not all illustrated blocks may be required to implement the methodologies in accordance with the invention. The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 5a, which illustrates a method 500 for determining optimal action based on risk analysis performed relative to a particular set of data. At 510, data is received, and at 512 products, devices, systems, processes and supplier technologies, for example, are mapped to the data. At 514, a risk analysis is performed to determine, infer or predict the level of component risk to EOL or unavailability, and their impact. Such a risk analysis can be accomplished in accordance with risk analysis systems and methods described herein. Based in part on the analysis (e.g., utility-based), at 516 an optimal action to be taken given the evidence is determined. At 520, the action is effected.

FIG. 5b provides additional details in connection with act 512. At 522, a database is accessed, and at 524 a mapping is performed to determine what primary devices, products, systems, processes, suppliers, technologies, individuals, etc. are affected by the component data. At 526, determine if tertiary products, devices, systems and the like might be affected. At 528, map specific devices, products, systems, processes, suppliers, technologies and individuals, for example, to various desired parameters. At 530, the interrelationship of affected primary and tertiary products, devices, systems, etc. is ascertained. At 532, the results are forwarded for risk analyses.

Turning now to FIG. 6, a methodology 600 is shown to determine a supplier risk score (SRS) in accordance with an aspect of the subject invention. The SRS is determined utilizing a supplier financial risk score (FRS) and the performance status score (SC). At 610, a supplier OPS code is downloaded. Each supplier can be assigned a particular OPS code, which is unique to the supplier. In this manner, every supplier can be readily identified and organized via any number of desired properties. At 612, a determination is made if the supplier has an OPS code. If the answer is no (status="N"), then at 614 an error is given and at 616 the SRS is determined to be 99 (e.g., out of 100). Thus, if the supplier does not have an OPS code, then a very high supplier risk score is assigned to that supplier.

If at 612, a supplier has an OPS code (status is not equal to N), the SC of the supplier is determined at 618. The SC can be a function of various parameters associated with the supplier relative to the quality of service they provide to the user. Such parameters can include quality of product, meeting delivery schedule, level of inventory, customer service, etc. In addition, the supplier's history of performance can be utilized to determine the current performance score.

At 620, the supplier's financial risk status (FRS) code is determined. Each supplier can have a unique FRS code assigned to it. In addition or alternatively, the FRS code can be assigned to a specific product that the supplier provides. At 622, the financial risk score (FSR) is determined. The FSR can be dependent on a number of factors such as supplier credit history, financial solvency, assets, etc. At 624, the SC and FSR are employed to determine the supplier risk score (SRC) per supplier part number.

Referring now to FIG. 7, which illustrates a methodology 700 employed to determine a particular entity part number MRI risk score. At 710, supplier part number MRI coefficients B(x) for multivariate regression analysis on MRI factors F(x). Multivariate regression provides a data model to determine a best fit when factors co-vary with each other. Such a model can be employed with MRI analysis to determine if there is a pattern of risk associated with a particular supplier's part number. At 712, once the B(x) coefficients have been determined, a particular supplier part number MRI risk score can be determined. It is to be appreciated that multiple supplier part numbers can be determined at this step. At 714, the supplier part number MRI risk score(s) are employed to determine an entity's part number MRI risk score.

Figure 8:
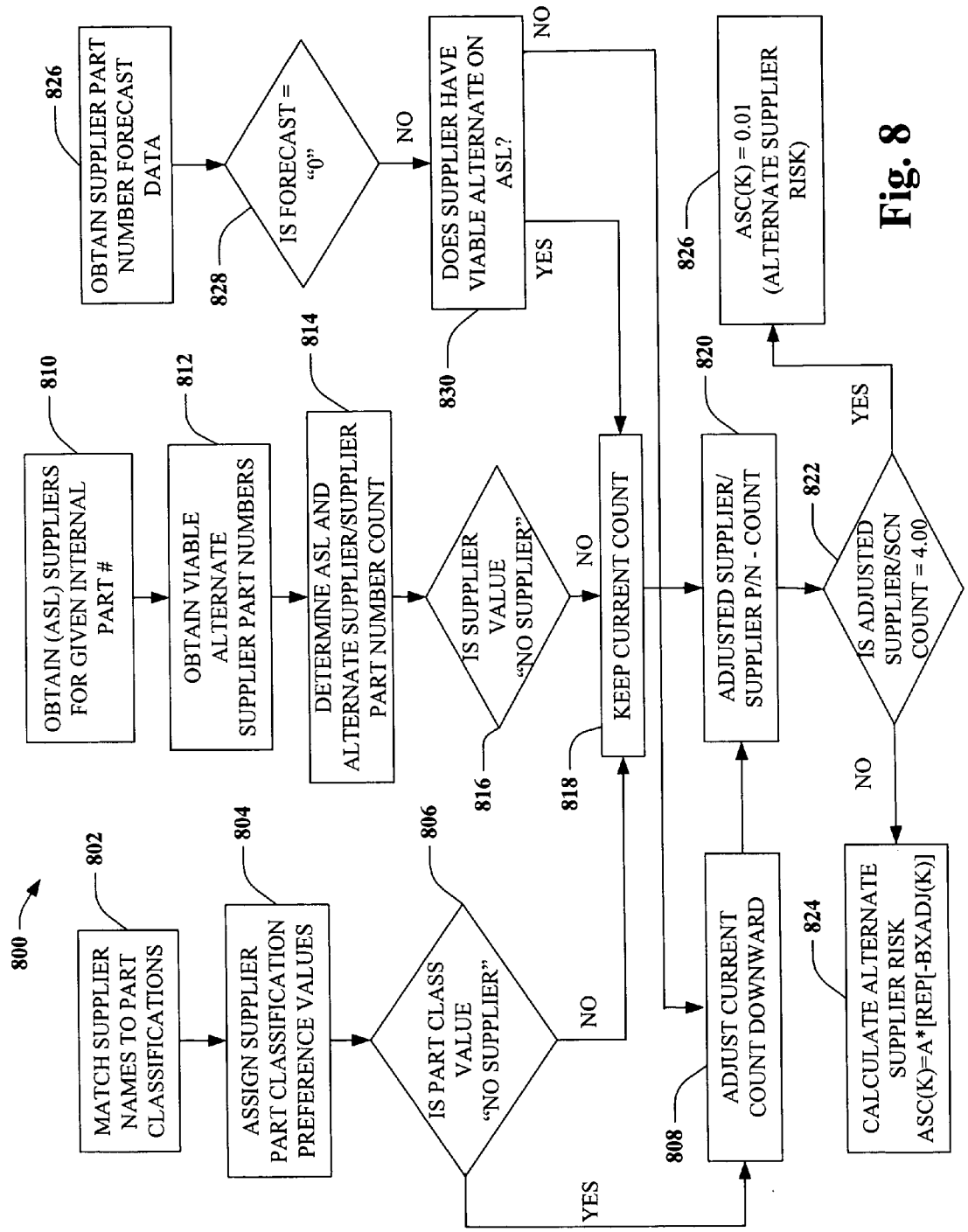

Turning now to FIG. 8, which illustrates a methodology 800 employed to determine alternate supplier/part risk. At 802, supplier names are matched to part classifications in order to find desired suppliers for a particular part. Once the suppliers are determined, part classification preference values are assigned to the suppliers at 804. At 806, a determination is made whether the part class value is "no supplier." If the part class value is "no supplier," the current count is adjusted downward at 808; if the class value is not "no supplier," the current count is kept at 818. The adjusted supplier part number count is made at 820. If the adjusted supplier part number count is equal to 4.00 at 822, the alternate supplier risk (ASC (k))=0.01 at 826. Alternatively, if the adjusted supplier part number count is not equal to 4.00, at 824 the alternate supplier risk is calculated via the formula ASC(k)=A*[rep[−B(x)Adj (k)].

Referring to 810, (ASL) suppliers for a given internal part number are obtained. At 812, viable alternate supplier part numbers are obtained. At 814, the ASL and alternate supplier/supplier part number count is determined. At 816, if the supplier value is not "no supplier," then the current count is kept at 818 and the alternate supplier risk is determined in steps 820-826, as noted above.

Supplier part number forecast data is obtained at 826 and a check is made at 828 to insure that the forecast is not equal to "0." At 830, assuming the forecast value is "0," a determination is made whether the supplier has a viable alternative on ASL. If there is a viable alternative, the count is kept current at 818. If there is no viable alternative, the current count is adjusted downward at 808. Whether the count is maintained at 818 or adjusted downward at 808, the alternate supplier risk is calculated at steps 820-826, as described above.

Figure 9:
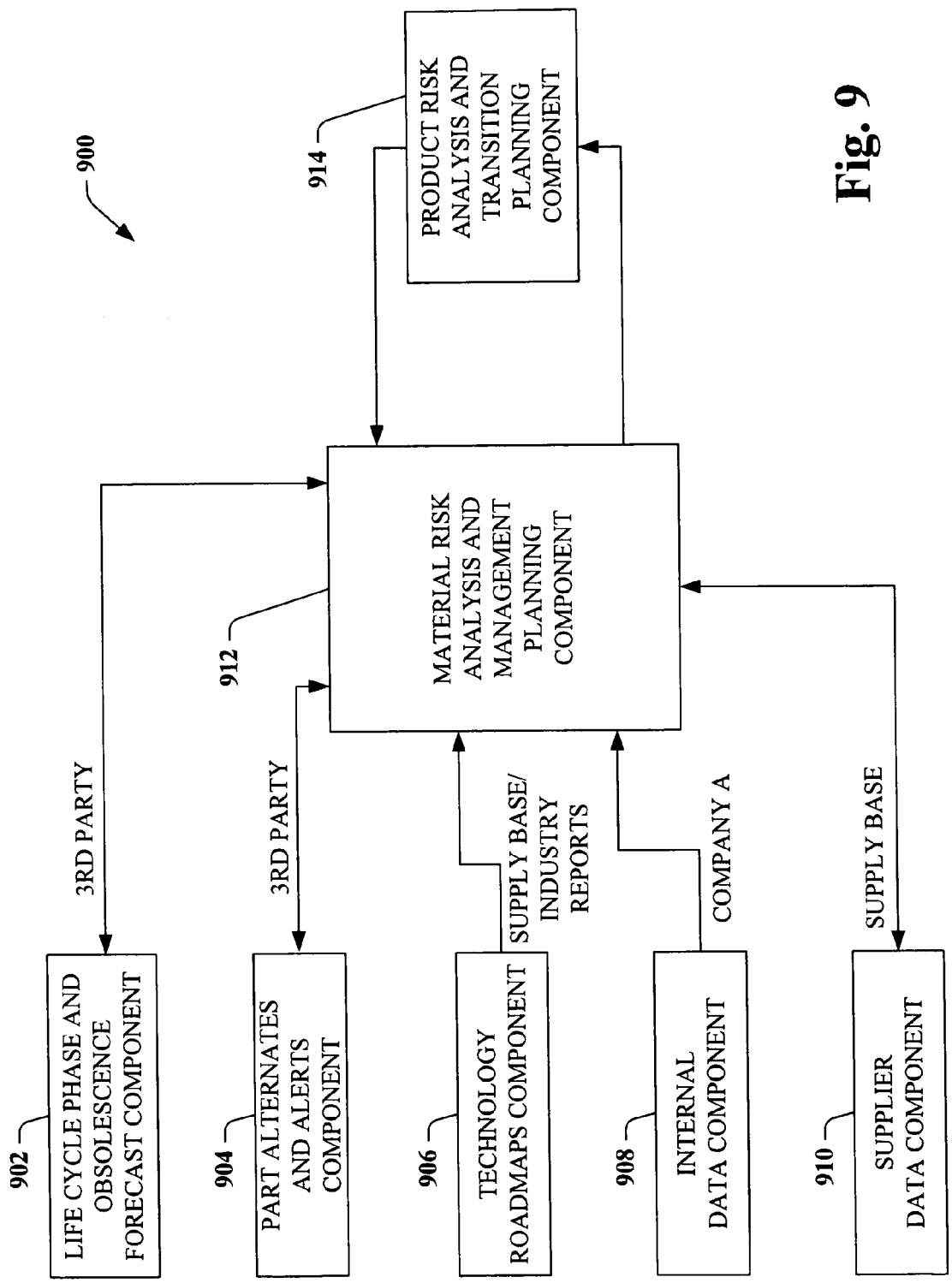
FIGS. 9-12 illustrate systems which employ material risk analysis information, in accordance with the invention.

Referring now to FIG. 9, shows a system 900 that employs a material risk analysis (MRA) and management planning component 912 to provide information to a product risk analysis (PRA) and transition planning component 914. The MRA component interfaces to the PRA component based on information obtained from components related to disparate aspects of products that may experience EOL issues such as a life cycle phase and obsolescence forecast component 902, a part alternates and alerts component 904, a technology roadmap component 906, an internal data component 908 and a supplier data component 910.

The life cycle phase (LCP) and obsolescence forecast component 902 can be employed to determine the length of time a particular product has before the product reaches EOL. The LCP component can consider factors such as the length of time the product has been in operation, the current state of technology, cost, average life cycle of similar products, etc. Supplier part number and/or internal part number can be employed to organize products at risk. Additionally, products can be sorted by product, family, technology supplier, part number, etc. Also, the LCP component can determine the length of time to phase in a new product once a particular product reaches EOL.

The part alternates and alerts (PAA) component 904 can be employed to provide a listing of suitable substitute products for a particular product currently in use. Alerts can be set to notify the user when a particular product has a new alternate or when alternates no longer exist. The technology roadmaps component 906 can maintain a database of current state of the art of various technologies and provide time lines for when new technologies will become available. Various sources can be employed to determine the current state of the art, including industry reports, internal data, a supply base and the like.

The internal data component 908 can supply information not readily available to the public such as internal product testing, quality control issues, etc. to the MRA component 912. Additionally, the supplier data component 910 can provide technical information such as sub-components employed in supplier products, length of component use, etc.

Thus, by utilizing such information, the MRA component 912 can provide proactive EOL management. Products utilized across business units can be identified and categorized and product volume and revenue forecasting can be provided. The quantity of at-risk components can be determined and a ranking of such components can be created. A link to parametric search and compare, datasheets and supplier websites can be provided to a user via the MRA component 912. In addition, supplier preference status can be determined based on supplier risk and financial risk status metrics, for example.

Moreover, the MRA component 912 can interface with the product risk analysis (PRA) and transition planning component 914 to facilitate commodity, technology and part planning processes. The PRA component 914 can facilitate commodity and part plans that can be established and entered into a database. Such a database can provide component volume and standard cost and indicate if a part is on corporate contract. Also, links to internal component history databases can be provided. The MRA component 912 can provide a material risk index (MRI) that can facilitate product action plans. The MRI index can be utilized to provide a product ranking for prioritization (e.g., what to do and when) that can facilitate a bill of materials analysis run by product, product family, business unit etc. In this manner, the PRA component 914 can provide product mitigation plans wherein links can be provided to an internal historic product corrective actions database(s) to leverage past experiences. Thus, the system 900 can provide proactive EOL management as it relates to any number of desired products.

Figure 10:
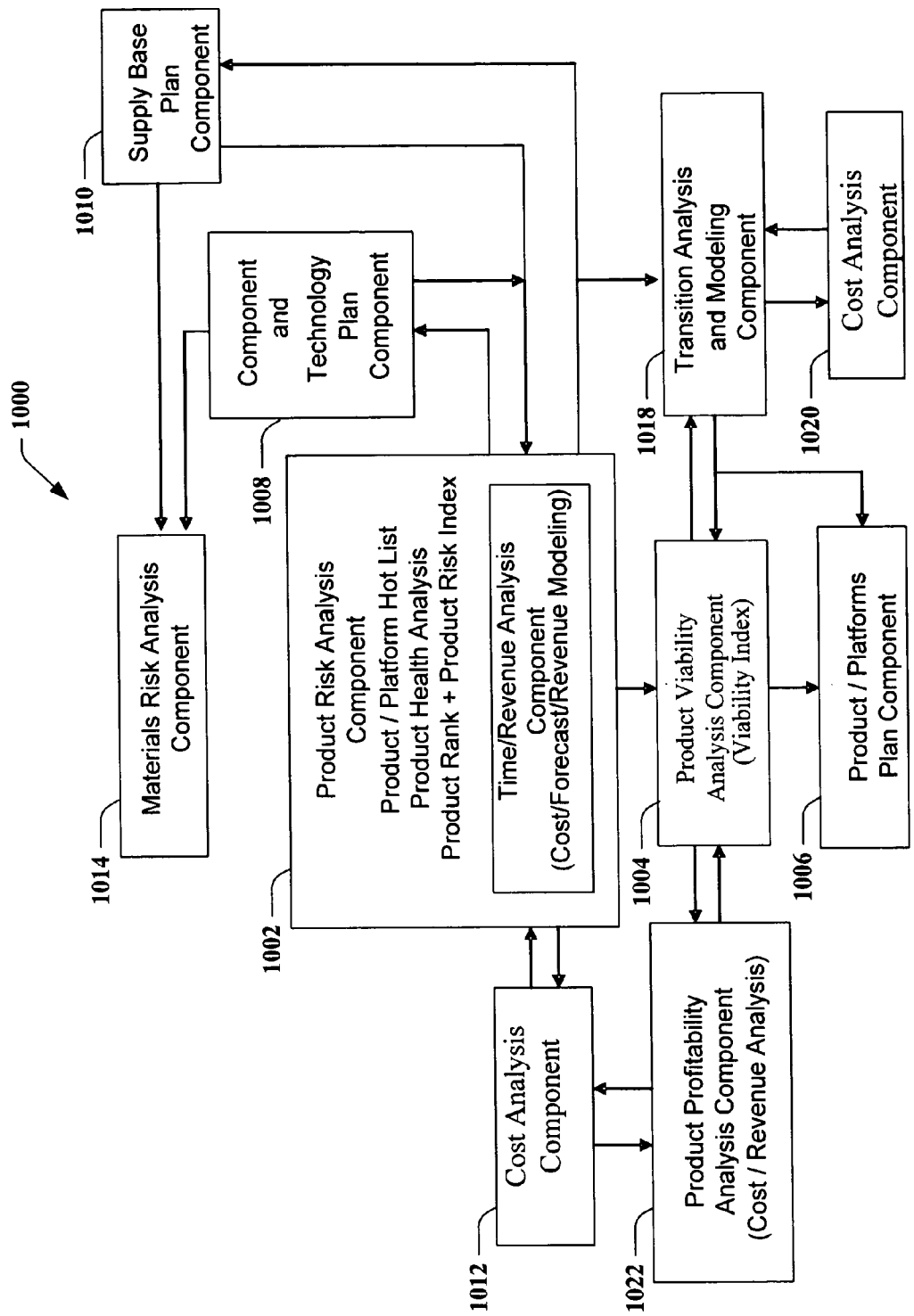

FIG. 10 illustrates a system 1000 according to an aspect of the invention. The system 1000 employs a product risk analysis (PRA) and time/revenue analysis component 1002 that provides information to a product viability analysis (PVA) component 1004. The PRA component 1002 interfaces to the PVA component 1004 based on information obtained from components related to disparate aspects of products that may experience EOL issues such as a component and technology plan component 1008, a supply base plan component 1010 and a cost analysis component 1012. The component and technology plan component 1008 and the supply base plan component 1010 interface with the materials risk analysis component 1014 in accordance with the subject invention.

The PRA component 1002 may include information regarding various internal history of a product such as, for example, if the product/platform is on a hot or watch list, a product health analysis, and/or the product rank and product risk index. Also interfaced with the PRA Component is a time/revenue modeling analysis component 1014 which considers product cost, forecast and revenue modeling data, for example.

The PRA component 1002 also interfaces with a transition analysis and modeling component 1018 which interfaces with both a cost analysis component 1020 and the PVA component 1004 to determine when a product should be removed or replaced due to factors such as obsolescence or high risk to EOL. Cost analysis takes into consideration application specific direct and indirect transmission or mitigation costs and can model those costs forward in time. For example, the transition analysis and modeling component 1018 receives an output from the PRA component 1002, PVA Component 1004 and cost analysis component 1020 to determine when a product should be replaced with another product because new technology or a substitute component has increased the product's risk to EOL. This information is incorporated into the Product/Platforms plan component 1006 to facilitate product management.

The PVA Component 1004 interfaces with a Product Profitability Analysis Component 1022 to establish cost/revenue analysis. The Product Profitability Component obtains data from both the PVA Component 1004 and a Cost Analysis Component 1012 to obtain information relating to the profitability of the product over the remaining life of the product in accordance with the invention.

Figure 11:
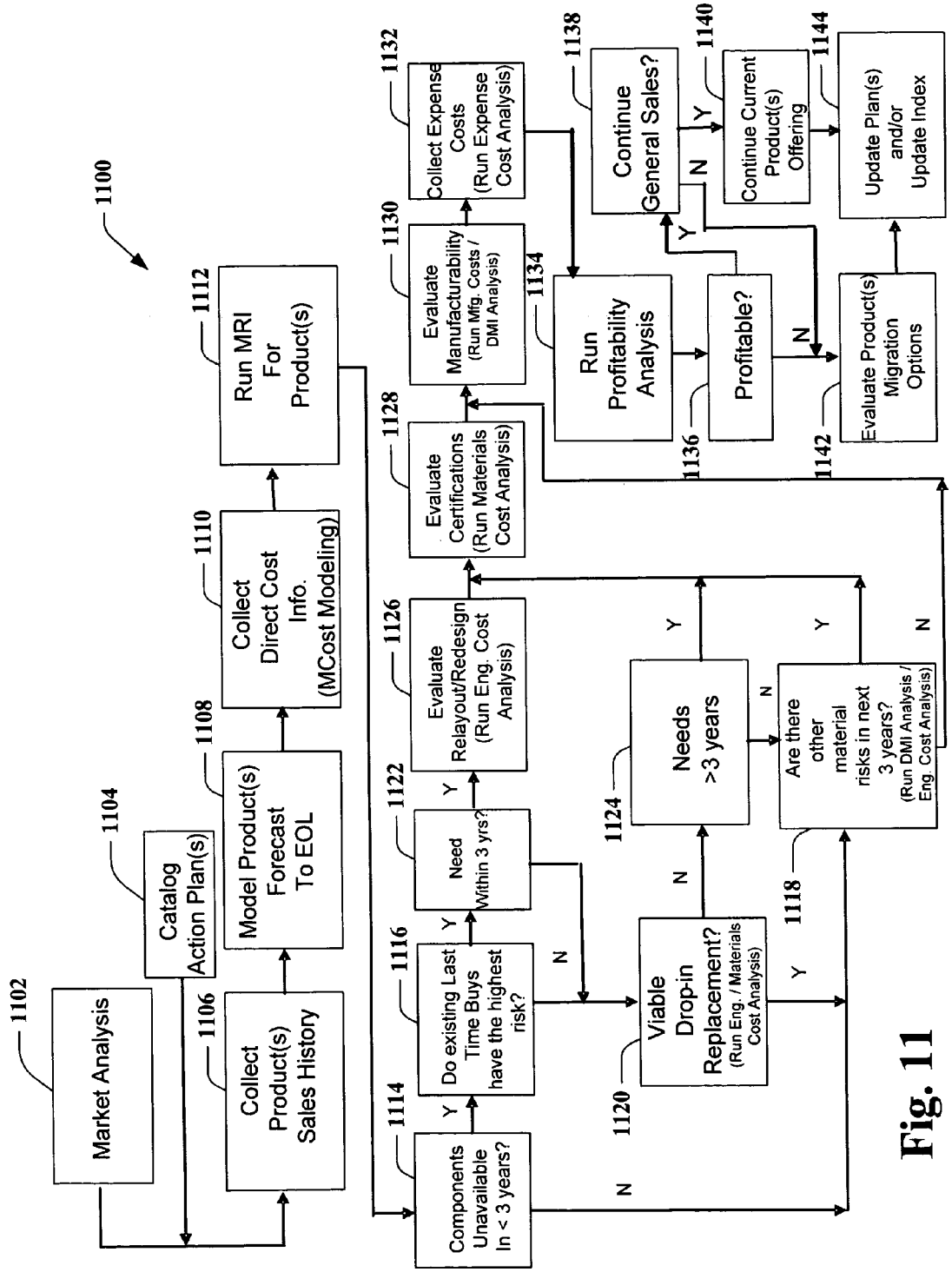

FIG. 11, illustrates a methodology 1100 employed to determine a viability/profitability analysis in accordance with an aspect of the invention. At 1102, market analysis is conducted or obtained. This market analysis may include various information such as product end-of-life (EOL) date and/or Customer Market Breadth. It may also include information obtained from a marketing department regarding other product indices monitored by a company, which can be input into the system. At 1104 addition data, such as a Catalog Action Plan(s) component of the MRI may be collected or attained. This may include catalog part number or supplier name, for example.

At 1106, relevant sales history of the product(s) is collected. This sales history can include the number of units sold, how many different customers purchased the component, the date of the sales, etc. At 1108, the system models product(s) forecast to EOL. At 1110, direct cost information to possible EOL is collected, which may be based upon MCost Modeling or other cost modeling tools. Act 1110 may include indirect cost analysis. At 1112, the Material Risk Index (MRI) for the product(s) is determined according to aspects of the invention.

Next a determination is made whether the product or components thereof will become unavailable in less than, for example, 3 years at 1114. It should be noted that the system may look at other time frames which may be determined by various factors and can be adjusted, either manually or automatically, as desired. If the determination at 1114 indicates the product(s) will be available after 3 years, a determination is made at 1118 whether there are other risks in the next 3 years, for example. If the determination at 1114 indicates the product(s) will become unavailable in less than 3 years, a determination is made at 1116 whether the last-time-buys have the highest risk. If not the highest risk, at 1120 it is determined whether there is a viable drop-in replacement for the product. This determination may consist of running an engineering/materials cost analysis. If there is a viable drop-in replacement the system proceeds to step 1118 which can include performing DMI analysis or engineering cost analysis, for example.

If there is no viable replacement, the system proceeds to 1124 and determines if the need for the product is longer than three years, for example. If no, the system proceeds to 1118, as discussed above. If at 1118 no material risks are indicated the system proceeds to a manufacturing evaluation at 1130, discussed further below. If there is a material risk, the system proceeds to 1128 to evaluate certifications or to run a materials cost analysis.

If at 1116 it is determined that the last time buys have the highest risk, the system proceeds to 1122 to determine if there is a need within 3 years. If no anticipated need, the system continues at 1120 as discussed above. If at 1122 there is a need within 3 years an evaluation of re-layout or redesign is performed at 1126 which may include running an engineering cost analysis. The system then proceeds to 1128 for certification evaluations, such as determining materials cost analysis.

At 1130, the system evaluates manufacturability by running a manufacturing costs/DMI Analysis, for example. At 1132, an Expense cost analysis is conducted to collect expense costs. At 1134 Profitability Analysis is conducted to determine the profitability of the product over its expected remaining life. The profitability analysis can generate a spreadsheet pertaining to the expected profitability of the product. The spreadsheet can provide various data including product sales history, estimated product forecast until EOL over a range of years, direct (standard) product cost, incremental indirect product costs, engineering sustainment costs and estimated operating earnings, for example. The incremental indirect product costs can include costs of test equipment, engineering support, purchasing, promotional expenses, sales expenses, ME support and TE support, for example. The engineering sustainment costs can include drop-in replacement costs, re-layout costs, and redesign costs, for example. Thus, the modeling forecast within the tool can estimate costs based on the current status and project those costs though the expected end of life.

At 1134 indirect cost analysis can be entered to indicate or predict profitability based upon where the product is at and project that cost though the end of life. Additionally, it uses parts of the MRI that determine when a part is expected to become obsolete over time and determines the costs of reengineering or part obsolescence. If the product is expected to remain profitable the system determines at 1138 if general sales will continue. If the profitability analysis at 1136 indicates the product is not profitable or if at 1138 it is determined that sales will not continue, the system proceeds to 1142 to evaluate the product(s) migration options and updates the product plan(s) and/or updates the product index at 1144. If, at 1138 sales are determined to continue, at 1140 the current product(s) offering continues and the system updates the product plans(s) such as marketing and catalog plans and/or updates a product viability index accordingly at 1144, according to aspects of the invention.

By way of example, an exemplary worksheet as discussed above with reference to FIG. 11 is provided below. It is appreciated that while this spreadsheet shows various rows and column headings, it can be provided with different or more or less headings. The headings could also be in a different order or arrangement. The worksheet can also show a longer or shorted time period depending on the estimated product EOL.

| Viability/Profitability Worksheet | | | | | |
|---|---|---|---|---|---|
| Product Name Viability Index N/A | | | | | |
| 1. Product Sales History | | | | | |
| Fiscal Year (FY) | 2002 | 2003 | Totals | | |
| Actual Units Sold | 10195 | 9364 | 19559 | | |
| Actual Revenue | $3,557,902 | $3,158,296 | $6,716,198 | | |
| Calculated Sale Price/Module | $349 | $337 | $343 | | |
| 2. Estimated Product Forecast Till EOL | | | | | |
| Estimated EOL Range (Yrs. 10-12) Est. EOL Date 2015 | | | | | |
| Forcast Fiscal Year (FY) 2004 | 2005 | 2006 | 2007 | 2008 | 2009 |
| Units (Sales Units) 9953 | 6120 | 4788 | 3733 | 3133 | 2533 |
| Rev. Forecast (Sales $) $2,738,050 | $1,738,896 | $1,360,431 | $1,060,670 | $966,029 | $781,025 |
| Calculated Sale Price/Module $275.10 | $284.13 | $284.13 | $284.13 | $308.34 | $308.34 |
| Avg. Sale Price/Module from Actual Forecast $275.10 | | | | | |
| TOTAL Est. Avg Sale Price/Module $308.34 | | | | | |
| 2. (Continued) Estimated Product Forecast Till EOL | | | | | |
| Estimated EOL Range (Yrs. 10-12) Est. EOL Date 2015 | | | | | |
| Estimated EOL 10-12 2015 | | | | | |
| Forcast Fiscal Year (FY) 2010 | 2011 | 2012 | 2013 | 2014 | 2015 |
| Units (Sales Units) 1933 | 1333 | 733 | 433 | 233 | 133 |
| Rev. Forecast (Sales $) $595,364 | $411,017 | $226,013 | $133,511 | $71,843 | $41,009 |
| Calculated Sale Price/Module $308.00 | $308.34 | $308.34 | $308.34 | $308.34 | $308.34 |
| 2. (Continued) Estimated Product Forecast Till EOL | | | | | |
| Estimated EOL Range (Yrs. 10-12) Est. EOL Date 2015 | | | | | |
| Forcast Fiscal Year (FY) Totals | | | | | |
| Units (Sales Units) 35058 | | | | | |
| Rev. Forecast (Sales $) $10,123,860 | | | | | |
| Calculated Sale Price/Module $288.77 | | | | | |
| 3. Direct (Standard) Product Cost | | | | | |
| 2004 | 2005 | 2006 | 2007 | 2008 | 2009 |
| Module Mcost $83.00 | $83.00 | $83.00 | $83.00 | $83.00 | $83.00 |
| TOTAL Direct (Standard) Cost $826,099 | $507,960 | $397,404 | $309,839 | $260,039 | $210,239 |

-continued

Viability/Profitability Worksheet

3. (Continued) Direct (Standard) Product Cost

| | 2010 | 2011 | 2012 | 2013 | 2014 | 2015 |
|---|---|---|---|---|---|---|
| Module Mcost | $83.00 | $83.00 | $83.00 | $83.00 | $83.00 | $83.00 |
| TOTAL Direct (Standard) Cost | $160,439 | $110,639 | $60,839 | $35,939 | $19,339 | $11,039 |

4. Incremental Indirect Product Costs

| | Time (hrs/yr) | Cost or Expense/yr. | Till EOL | |
|---|---|---|---|---|
| ME Support | 20 | $1,600.00 | $16,000 | |
| TE Support | 8 | $640.00 | $6,400 | |
| Test Equipment | | $2,000.00 | $20,000.00 | |
| Engineering Support | 80 | $6,400.00 | $64,000.00 | |
| Purchasing | | $2,500.00 | $25,000.00 | |
| Promotional Expense | | | | |
| Sales Expense | | | | |
| TOTALS | | $13,140.00 | $131,400.00 | |
| TOTAL Per/Module Cost | | | | $3.75 |

5. Engineering Sustainment Costs

| Fiscal Year | 2004 | 2005 | 2006 | 2007 | 2008 | 2009 |
|---|---|---|---|---|---|---|
| Drop-in Cost ($20,000 Min-$150,000 Max) | $0 | $0 | $0 | $0 | $0 | $0 |
| Re-layout Costs ($150,000 Min-$250,000 Max) | $0 | $150,000 | $0 | $150,000 | $0 | $150,000 |
| Redesign Cost ($250,000 Min-$500,000 Max) | $0 | $0 | $0 | $0 | $0 | $0 |
| TOTAL Sustainment Cost/Year (MRI Cost Analysis) | $0 | $150,000 | $0 | $150,000 | $0 | $150,000 |

5. Engineering Sustainment Costs

| Fiscal Year | 2010 | 2011 | 2012 | 2013 | 2014 | 2015 |
|---|---|---|---|---|---|---|
| Drop-in Cost ($20,000 Min-$150,000 Max) | $0 | $0 | $0 | $0 | $0 | $0 |
| Re-layout Costs ($150,000 Min-$250,000 Max) | $0 | $0 | $0 | $150,000 | $0 | $0 |
| Redesign Cost ($250,000 Min-$500,000 Max) | $0 | $0 | $0 | $0 | $0 | $0 |
| TOTAL Sustainment Cost/Year (MRI Cost Analysis) | $0 | $0 | $0 | $150,000 | $0 | $0 |

6. Estimated Operating Earnings

| Fiscal Year (FY) | Year FY04 | Year 05 | Year 06 | Year 07 |
|---|---|---|---|---|
| Units (Sales Units) | 9953 | 6120 | 4788 | 3733 |
| Net Rev. Forecast (Sales Margin $) | $1,911,951 | $1,230,936 | $963,027 | $750,831 |
| % Net Rev Forecast (Sales Margin %) | 30.17% | 29.21% | 29.21% | 29.21% |
| Net Sale Price/Module | $192.10 | $201.13 | $201.13 | $201.13 |
| Pro-Active Sustainment Costs (MRI Cost Analysis) | $0.00 | $150,000.00 | $0.00 | $0.00 |
| Incremental Indirect Costs | $37,304.59 | $22,938.22 | $17,945.78 | $13,991.56 |
| LTB Expense ($) | $0.00 | $0.00 | $0.00 | $0.00 |
| EOL Scrap ($) | $0.00 | $0.00 | $0.00 | $0.00 |
| % Pro-Active Net Rev. (Operating Earnings %) | 68.47% | 60.84% | 69.47% | 69.47% |
| Pro-Active Net Rev. (Operating Earnings) | $1,874,646 | $1,057,998 | $945,081 | $736,839 |

6. (Continued) Estimated Operating Earnings

| Fiscal Year (FY) | Year 08 | Year 09 | Year 10 | Year 11 |
|---|---|---|---|---|
| Units (Sales Units) | 3133 | 2533 | 1933 | 1333 |
| Net Rev. Forecast (Sales Margin $) | $705,990 | $570,786 | $434,925 | $300,378 |

-continued

| Viability/Profitability Worksheet | | | | |
|---|---|---|---|---|
| % Net Rev Forecast (Sales Margin %) | 26.92% | 26.92% | 26.95% | 26.92% |
| Net Sale Price/Module | $308.34 | $308.34 | $308.00 | $308.34 |
| Pro-Active Sustainment Costs (MRI Cost Analysis) | $0.00 | | $150,000.00 | $0.00 |
| Incremental Indirect Costs | $11,742.72 | $9,493.87 | $7,245.03 | $4,996.18 |
| LTB Expense ($) | $0.00 | $0.00 | $0.00 | $0.00 |
| EOL Scrap ($) | $0.00 | $0.00 | $0.00 | $0.00 |
| % Pro-Active Net Rev. (Operating Earnings %) | 71.87% | 71.87% | 46.64% | 71.87% |
| Pro-Active Net Rev. (Operating Earnings) | $694,248 | $561,292 | $277,680 | $295,382 |

6. (Continued) Estimated Operating Earnings

| Fiscal Year (FY) | Year 12 | Year 13 | Year 14 | Year 15 |
|---|---|---|---|---|
| Units (Sales Units) | 733 | 433 | 233 | 133 |
| Net Rev. Forecast (Sales Margin $) | $165,174 | $97,572 | $52,504 | $29,970 |
| % Net Rev Forecast (Sales Margin %) | 26.92% | 26.92% | 26.92% | 26.92% |
| Net Sale Price/Module | $308.34 | $308.34 | $308.34 | $308.34 |
| Pro-Active Sustainment Costs (MRI Cost Analysis) | $0.00 | $0.00 | $0.00 | $0.00 |
| Incremental Indirect Costs | $2,747.34 | $1,622.92 | $873.30 | $498.49 |
| LTB Expense ($) | $0.00 | $0.00 | $0.00 | $0.00 |
| EOL Scrap ($) | $0.00 | $0.00 | $0.00 | $0.00 |
| % Pro-Active Net Rev. (Operating Earnings %) | 71.87% | 71.87% | 71.87% | 71.87% |
| Pro-Active Net Rev. (Operating Earnings) | $162,427 | $95,949 | $51,631 | $29,472 |

6. (Continued) Estimated Operating Earnings

| Fiscal Year (FY) | TOTALS |
|---|---|
| Units (Sales Units) | 35058 |
| Net Rev. Forecast (Sales Margin $) | $10,123,860 |
| % Net Rev Forecast (Sales Margin %) | |
| Net Sale Price/Module | $288.77 |
| Pro-Active Sustainment Costs (MRI Cost Analysis) | |
| Incremental Indirect Costs | |
| LTB Expense ($) | |
| EOL Scrap ($) | |
| % Pro-Active Net Rev. (Operating Earnings %) | |
| Pro-Active Net Rev. (Operating Earnings) | $6,782,646 |

| | FY04 | FY05 | FY06 | FY07 | FY08 |
|---|---|---|---|---|---|
| Reactive Sustainment Cost (MRI Cost Analysis) | $0.00 | $0.00 | $0.00 | $150,000.00 | $0.00 |
| Bridge Buy | $0.00 | $0.00 | $0.00 | $30,794.26 | $0.00 |
| LTB Expense ($) | $0.00 | $0.00 | $0.00 | $0.00 | $0.00 |
| EOL Scrap ($) | $0.00 | $0.00 | $0.00 | $0.00 | $0.00 |
| % Reactive Net Rev. (Operating Earnings %) | 68.47% | 69.47% | 69.47% | 52.42% | 75.05% |
| Reactive Net Rev. (Operating Earnings) | $1,874,646 | $1,207,998 | $945,081 | $556,045 | $725,042 |

| (Continued) | FY09 | FY10 | FY11 | FY12 |
|---|---|---|---|---|
| Reactive Sustainment Cost (MRI Cost Analysis) | $150,000.00 | $0.00 | $0.00 | $0.00 |
| Bridge Buy | $17,814.53 | $0.00 | $0.00 | $0.00 |
| LTB Expense ($) | $0.00 | $0.00 | $0.00 | $0.00 |
| EOL Scrap ($) | $0.00 | $0.00 | $0.00 | $0.00 |
| % Reactive Net Rev. (Operating Earnings %) | 50.38% | 74.83% | 71.87% | 71.87% |

-continued

| Viability/Profitability Worksheet | | | | |
|---|---|---|---|---|
| Reactive Net Rev. (Operating Earnings) Pro-Active Process Savings % Process Savings (Net) | $393,478 | $445,494 | $295,382 | $162,427 |

| (Continued) | FY13 | FY14 | FY15 | TOTALS |
|---|---|---|---|---|
| Reactive Sustainment Cost (MRI Cost Analysis) | $150,000.00 | $0.00 | $0.00 | |
| Bridge Buy | $0.00 | $0.00 | $0.00 | |
| LTB Expense ($) | $0.00 | $0.00 | $0.00 | |
| EOL Scrap ($) | $0.00 | $0.00 | $0.00 | |
| % Reactive Net Rev. (Operating Earnings %) | −40.48% | 71.87% | 71.87% | |
| Reactive Net Rev. (Operating Earnings) Pro-Active Process Savings % Process Savings (Net) | −$54,051 | $51,631 | $29,472 | $6,632,645.54 $150,000.00 1.48% |

Figure 12:
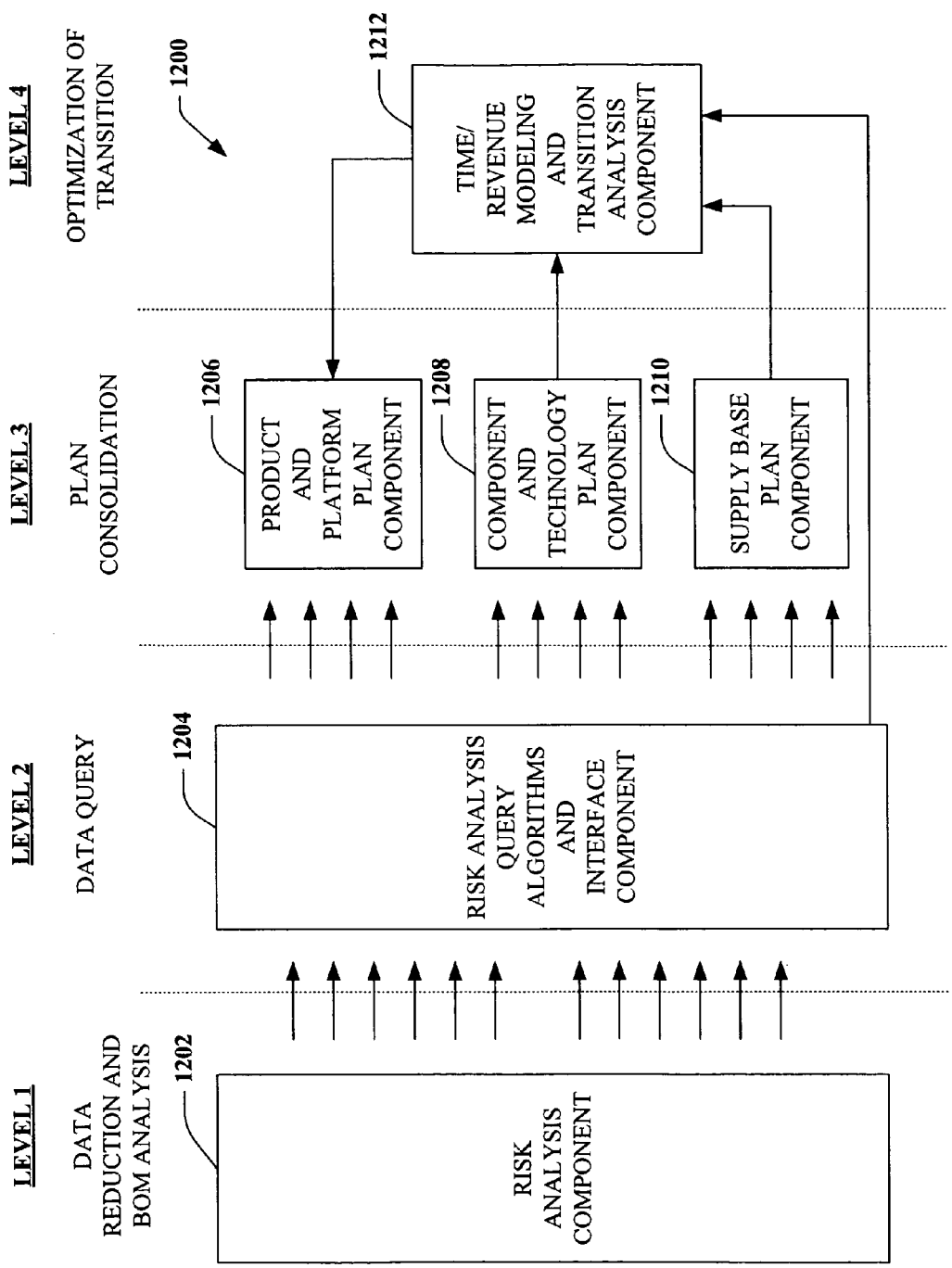

Referring now to FIG. 12, a system 1200 that illustrates implementing risk analysis data to facilitate transition from current product use to new product use, in accordance with an aspect of the subject invention. The system illustrates four levels of implementation of risk analysis data, as described above. At level 1, a risk analysis component 1202 can provide bill of material analysis and data reduction, as described supra. Such risk analysis data can be queried via a risk analysis query algorithms and interface component 1204 at level 2 to be implemented in one or plans at level 3 such as, for example, a product and platform plan component 1206, a component and technology plan component 1208, and a supply base plan component 1210. Such plans can be consolidated and employed in time/revenue modeling and transition analysis component 1212 to provide optimal transition from an EOL product to a new product, for example.

Figure 13:
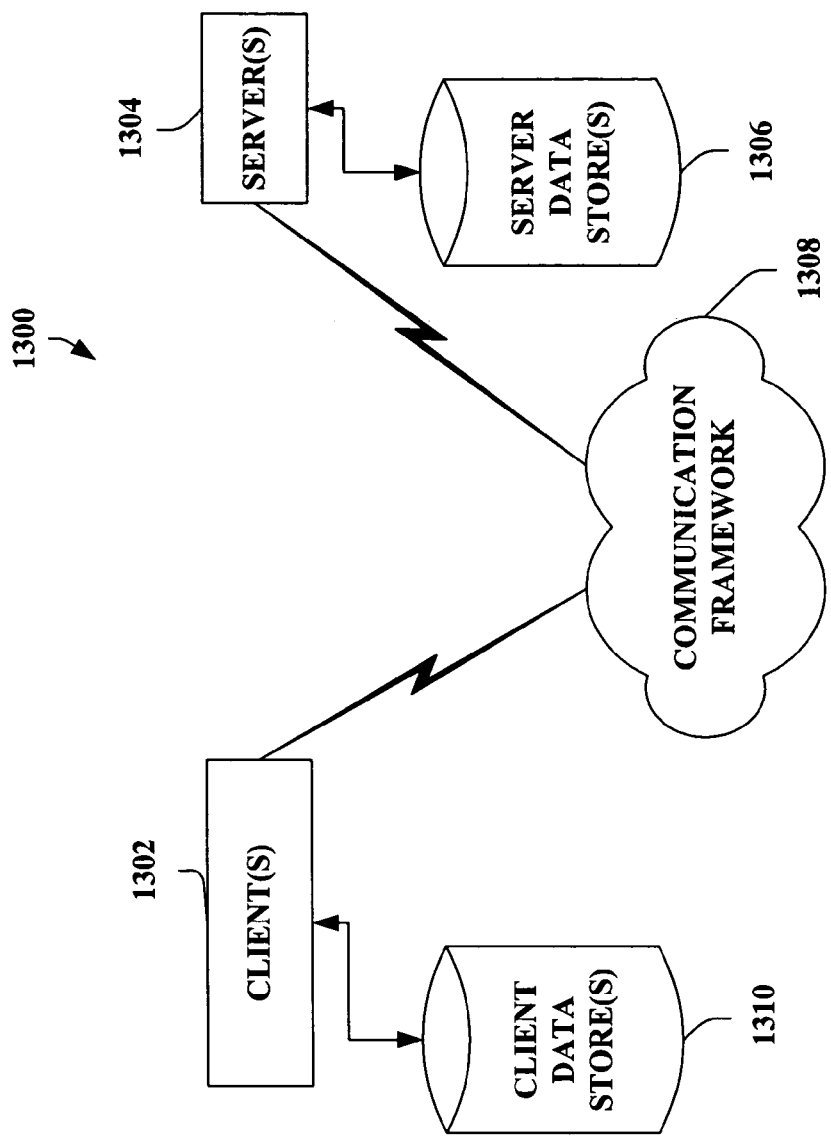
FIGS. 13 and 14 illustrate representative computing and operational environments, in accordance with the invention.
Figure 14:
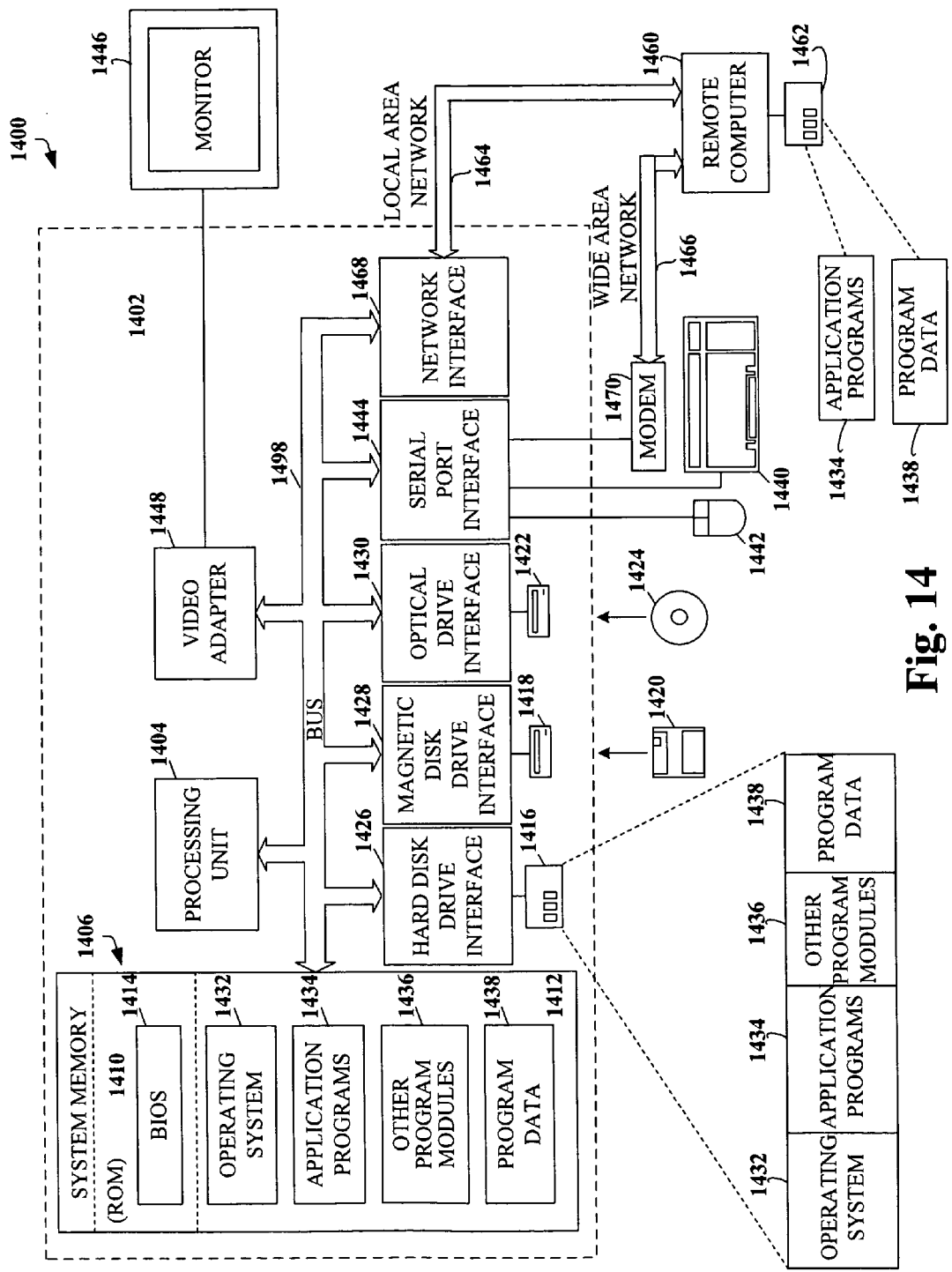

In order to provide additional context for implementing various aspects of the invention, FIGS. 13 and 14 and the following discussion is intended to provide a brief, general description of suitable computing environments in which the various aspects of the invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

FIG. 13 is a block diagram of a sample computing environment 1300 with which the invention can interact. The system 1300 further illustrates a system that includes one or more client(s) 1302. The client(s) 1302 can be hardware and/or software (e.g., threads, processes, computing devices). The system 1300 also includes one or more server(s) 1304. The server(s) 1304 can also be hardware and/or software (e.g., threads, processes, computing devices). The server(s) 1304 can house threads to perform transformations by employing the invention, for example. One possible communication between a client 1302 and a server 1304 may be in the form of a data packet adapted to be transmitted between two or more computer processes. The system 1300 includes a communication framework 1308 that can be employed to facilitate communications between the client(s) 1302 and the server(s) 1304. The client(s) 1302 are operably connected to one or more client data store(s) 1310 that can be employed to store information local to the client(s) 1302. Similarly, the server(s) 1304 are operably connected to one or more server data store(s) 1306 that can be employed to store information local to the server(s) 1304.

With reference to FIG. 14, another exemplary system environment 1400 for implementing the various aspects of the invention includes a conventional computer 1402, including a processing unit 1404, a system memory 1406, and a system bus 1408 that couples various system components, including the system memory, to the processing unit 1404. The processing unit 1404 may be any commercially available or proprietary processor. In addition, the processing unit may be implemented as multi-processor formed of more than one processor, such as may be connected in parallel.

The system bus 1408 may be any of several types of bus structure including a memory bus or memory controller, a peripheral bus, and a local bus using any of a variety of conventional bus architectures such as PCI, VESA, Microchannel, ISA, and EISA, to name a few. The system memory 1106 includes read only memory (ROM) 1410 and random access memory (RAM) 1412. A basic input/output system (BIOS) 1414, containing the basic routines that help to transfer information between elements within the computer 1402, such as during start-up, is stored in ROM 1410.

The computer 1402 also may include, for example, a hard disk drive 1416, a magnetic disk drive 1418, e.g., to read from or write to a removable disk 1420, and an optical disk drive 1422, e.g., for reading from or writing to a CD-ROM disk 1424 or other optical media. The hard disk drive 1416, magnetic disk drive 1418, and optical disk drive 1422 are connected to the system bus 1408 by a hard disk drive interface 1426, a magnetic disk drive interface 1428, and an optical drive interface 1430, respectively. The drives 1416-1422 and their associated computer-readable media provide nonvolatile storage of data, data structures, computer-executable instructions, etc. for the computer 1402. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1400, and further that any such media may contain computer-executable instructions for performing the methods of the invention.

A number of program modules may be stored in the drives 1416-1422 and RAM 1412, including an operating system 1432, one or more application programs 1434, other program modules 1436, and program data 1438. The operating system 1432 may be any suitable operating system or combination of operating systems. By way of example, the application programs 1434 and program modules 1436 can include inferring a location of a device in accordance with an aspect of the invention.

A user can enter commands and information into the computer 1402 through one or more user input devices, such as a keyboard 1440 and a pointing device (e.g., a mouse 1442). Other input devices (not shown) may include a microphone, a joystick, a game pad, a satellite dish, wireless remote, a scanner, or the like. These and other input devices are often connected to the processing unit 1404 through a serial port interface 1444 that is coupled to the system bus 1408, but may be connected by other interfaces, such as a parallel port, a game port or a universal serial bus (USB). A monitor 1446 or other type of display device is also connected to the system bus 1408 via an interface, such as a video adapter 1448. In addition to the monitor 1446, the computer 1402 may include other peripheral output devices (not shown), such as speakers, printers, etc.

It is to be appreciated that the computer 1402 can operate in a networked environment using logical connections to one or more remote computers 1460. The remote computer 1460 may be a workstation, a server computer, a router, a peer device or other common network node, and typically includes many or all of the elements described relative to the computer 1402, although, for purposes of brevity, only a memory storage device 1462 is illustrated in FIG. 14. The logical connections depicted in FIG. 14 can include a local area network (LAN) 1464 and a wide area network (WAN) 1166. Such networking environments are commonplace in offices, enterprise-wide computer networks, intranets and the Internet.

When used in a LAN networking environment, for example, the computer 1102 is connected to the local network 1464 through a network interface or adapter 1468. When used in a WAN networking environment, the computer 1402 typically includes a modem (e.g., telephone, DSL, cable, etc.) 1470, or is connected to a communications server on the LAN, or has other means for establishing communications over the WAN 1166, such as the Internet. The modem 1470, which can be internal or external relative to the computer 1402, is connected to the system bus 1408 via the serial port interface 1444. In a networked environment, program modules (including application programs 1434) and/or program data 1438 can be stored in the remote memory storage device 1462. It will be appreciated that the network connections shown are exemplary and other means (e.g., wired or wireless) of establishing a communications link between the computers 1402 and 1460 can be used when carrying out an aspect of the invention.

In accordance with the practices of persons skilled in the art of computer programming, the invention has been described with reference to acts and symbolic representations of operations that are performed by a computer, such as the computer 1402 or remote computer 1460, unless otherwise indicated. Such acts and operations are sometimes referred to as being computer-executed. It will be appreciated that the acts and symbolically represented operations include the manipulation by the processing unit 1404 of electrical signals representing data bits which causes a resulting transformation or reduction of the electrical signal representation, and the maintenance of data bits at memory locations in the memory system (including the system memory 1406, hard drive 1416, floppy disks 1420, CD-ROM 1424, and remote memory 1462) to thereby reconfigure or otherwise alter the computer system's operation, as well as other processing of signals. The memory locations where such data bits are maintained are physical locations that have particular electrical, magnetic, or optical properties corresponding to the data bits.

What has been described above includes examples of the invention. It is, of course, not possible to describe every conceivable combination of components or methodologies for purposes of describing the invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that facilitates product management, comprising:
    a processor coupled to at least one memory that executes the following computer-executable components:
    an analysis component that infers a risk of obsolescence and end-of-life (EOL) of a component of a product, the analysis component determines the risk of EOL based at least in part on a supplier material risk index (SMRI) using the equation: $SMRI = b0 + b1(SSC) + b2(ASC) + b3(LCC) + b4(CL) + \ldots + bN(AV)$, where N is an integer, b0-bN are coefficients obtained through multi-regression analysis, SSC is a supplier status code, ASC is an alternate source code, LCC is a component life cycle code, CL is a classification life cycle code, and AV is an availability code;
    a viability component that determines sustainability of the product based at least in part on the inferred risk of obsolescence and EOL of the component; and
    a notification component that provides notification to at least one of an individual, a computer, or a system regarding obsolescence and risk to end-of-life of the component of the product, and provides at least one recommendation in accordance therewith.

2. The system of claim 1, the viability component measures the product's risk of obsolescence in terms of a set of viability factors.

3. The system of claim 2, the viability factors further including a product criticality that rates a degree of the product's interaction with other system components.

4. The system of claim 3, the analysis component analyzes a product's bill of materials and computes a risk of obsolescence of each component thereon.

5. The system of claim 4, the notification component provides a list of products ranked according to risk of obsolescence based on analyses of the respective products' bills of material.

6. The system of claim 1, further comprising a transition component that analyzes risk analysis index data and cost analysis data, and determines product replacement scheduling based on the analysis.

7. The system of claim 1, further comprising an artificial intelligence (AI) component that performs at least one of a probabilistic based analysis of the risk of obsolescence and EOL associated with the product to assist in the viability assessment, a statistical based analysis of the risk of obsolescence and EOL associated with the product, or a rule-based analysis of the risk of obsolescence and EOL associated with the product.

8. The system of claim 1, further comprising a mapping component that associates at least one of a set of components to at least one supplier, a set of components to at least one product, at least one first product to at least one second product, at least one product to at least one process, or at least one product to at least one system.

9. The system of claim 8, further comprising a substitution component that determines at least one replacement component, supplier, or product based at least in part on at least one of the associations determined by the mapping component.

10. The system of claim 1, further comprising a profitability analysis component that determines an expected revenue from a product component over its remaining life, and based on the expected revenue suggests that the product be at least one of replaced with a substitute product, upgraded, or discontinued.

11. A computer implemented method for product management comprising:
employing a processor coupled to at least one memory to implement the following acts:
forecasting a quantitative risk of obsolescence or EOL of a component of a product based at least in part on a supplier material risk index (SMRI) using the equation: $SMRI = b_0 + b_1(SSC) + b_2(ASC) + b_3(LCC) + b_4(CL) + \ldots + b_N(AV)$, where N is an integer, $b_0$-$b_N$ are coefficients obtained through multi-regression analysis, SSC is a supplier status code, ASC is an alternate source code, LCC is a component life cycle code, CL is a classification life cycle code, and AV is an availability code;
determining a sustainability of the product based upon the forecasted risk of obsolescence or EOL of the component; and
notifying at least one entity of the determined sustainability of the product, wherein the entities include at least one of an individual, a group, a supplier, an alternate supplier, a customer, a device, a computer, or a system.

12. The method of claim 11, determining the sustainability of the product comprising scoring the product in terms of a set of viability factors that measure the product's sustainability, the viability factors including at least a measure of the product's potential market and a measure of the actual market using the product.

13. The method of claim 12, further comprising performing a probabilistic-based utility analysis in connection with scoring the product in terms of the set of viability factors.

14. The method of claim 12, further comprising:
repeating the acts of forecasting and determining for each of a set of products;
ranking the set of products according to their respectively determined sustainabilities; and
displaying the ranked set of products to a user.

15. The method of claim 11, further comprising automatically prioritizing component replacement schedule based on the forecasted quantitative risk of obsolescence.

16. The method of claim 11, further comprising mapping at least one of a set of components to at least one supplier, a set of components to at least one product, at least one first product to at least one second product, at least one product to at least one process, or at least one product to at least one system.

17. The method of claim 16, further comprising determining at least one replacement component, supplier, or product based at least in part on at least one of the mapped components or products.

18. The method of claim 11, further comprising analyzing an expected revenue for a product over its remaining life, and suggesting based at least in part on the analysis of the expected revenue that the product be at least one of replaced with a substitute product, upgraded, or discontinued.

* * * * *